United States Patent
Relyea et al.

(10) Patent No.: US 9,253,531 B2
(45) Date of Patent: Feb. 2, 2016

(54) METHODS AND SYSTEMS FOR MANAGING MEDIA CONTENT SESSIONS

(75) Inventors: Donald H. Relyea, Dallas, TX (US); Brian F. Roberts, Dallas, TX (US); Heath Stallings, Colleyville, TX (US); Lonnie Katai, Murphy, TX (US); Michael D'Argenio, Green Brook, NJ (US); Sudhanshu Sharma, Coppell, TX (US); Jayson Sellers, Carrollton, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 105 days.

(21) Appl. No.: 13/104,916

(22) Filed: May 10, 2011

(65) Prior Publication Data
US 2012/0291060 A1 Nov. 15, 2012

(51) Int. Cl.
*H04N 7/16* (2011.01)
*H04N 21/436* (2011.01)
*H04N 21/41* (2011.01)
*H04N 21/431* (2011.01)

(52) U.S. Cl.
CPC ..... *H04N 21/43615* (2013.01); *H04N 21/4126* (2013.01); *H04N 21/4312* (2013.01)

(58) Field of Classification Search
CPC .... H04N 7/163; H04N 21/4221; H04N 21/20
USPC ........................................................... 725/25
See application file for complete search history.

(56) References Cited

U.S. PATENT DOCUMENTS

| | | | |
|---|---|---|---|
| 2003/0002849 A1* | 1/2003 | Lord .............................. | 386/46 |
| 2005/0028208 A1* | 2/2005 | Ellis et al. ....................... | 725/58 |
| 2006/0026279 A1* | 2/2006 | Zigmond et al. ............... | 709/224 |
| 2007/0079340 A1* | 4/2007 | McEnroe ......................... | 725/78 |
| 2007/0271338 A1* | 11/2007 | Anschutz ........................ | 709/204 |
| 2008/0060038 A1* | 3/2008 | Stallings et al. ............... | 725/115 |
| 2009/0089824 A1* | 4/2009 | Beyabani ......................... | 725/17 |
| 2012/0062471 A1* | 3/2012 | Poulidis et al. ................. | 345/173 |
| 2012/0066602 A1* | 3/2012 | Chai et al. ....................... | 715/733 |
| 2012/0131110 A1* | 5/2012 | Buyukkoc et al. ............. | 709/206 |

FOREIGN PATENT DOCUMENTS

WO    WO 2005017660 A2 *   2/2005

* cited by examiner

*Primary Examiner* — Nathan Flynn
*Assistant Examiner* — Alfonso Castro

(57) ABSTRACT

Exemplary methods and systems for managing media content sessions are disclosed herein. As described in more detail below, a media content access device may detect a media content session associated with the media content access device, communicate with one or more other media content access devices by way of a local area network to detect one or more other media content sessions associated with the one or more other media content access devices, and present a graphical user interface configured to facilitate user management of the media content session and the one or more other media content sessions. Corresponding methods and systems are also disclosed.

23 Claims, 20 Drawing Sheets

METHODS AND SYSTEMS FOR MANAGING MEDIA CONTENT SESSIONS

BACKGROUND INFORMATION

Personal computers, handheld devices, mobile phones, set-top box devices, and other electronic devices are increasingly being used to access, store, download, play back, and/or otherwise process various types of media content (e.g., video, audio, photographs, and/or multimedia). In a typical scenario, a user may have multiple access devices at a common location (e.g., the user's home or office). For example, a user may have a first access device in a first room (e.g., a first set-top box device in a bedroom) of the user's home, a second access device in a second room (e.g., a second set-top box device in a kitchen) of the user's home, and a third access device in a third room (e.g., a third set-top box device in a child's bedroom). In a typical configuration such as this, each of the access devices independently accesses and processes media content in one or more media content sessions.

Conventional implementations of multiple access devices at a common location have limited functionality when it comes to enabling a user operating one of the access devices to access, manage, and/or control the processing of media content sessions by the other access devices. For example, in a conventional implementation of multiple set-top box devices in a home, a user operating one of the set-top box devices in a room of the home is provided with limited or no capability for accessing, managing, and/or controlling the processing of media content sessions by the other set-top box devices located in other rooms of the home.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
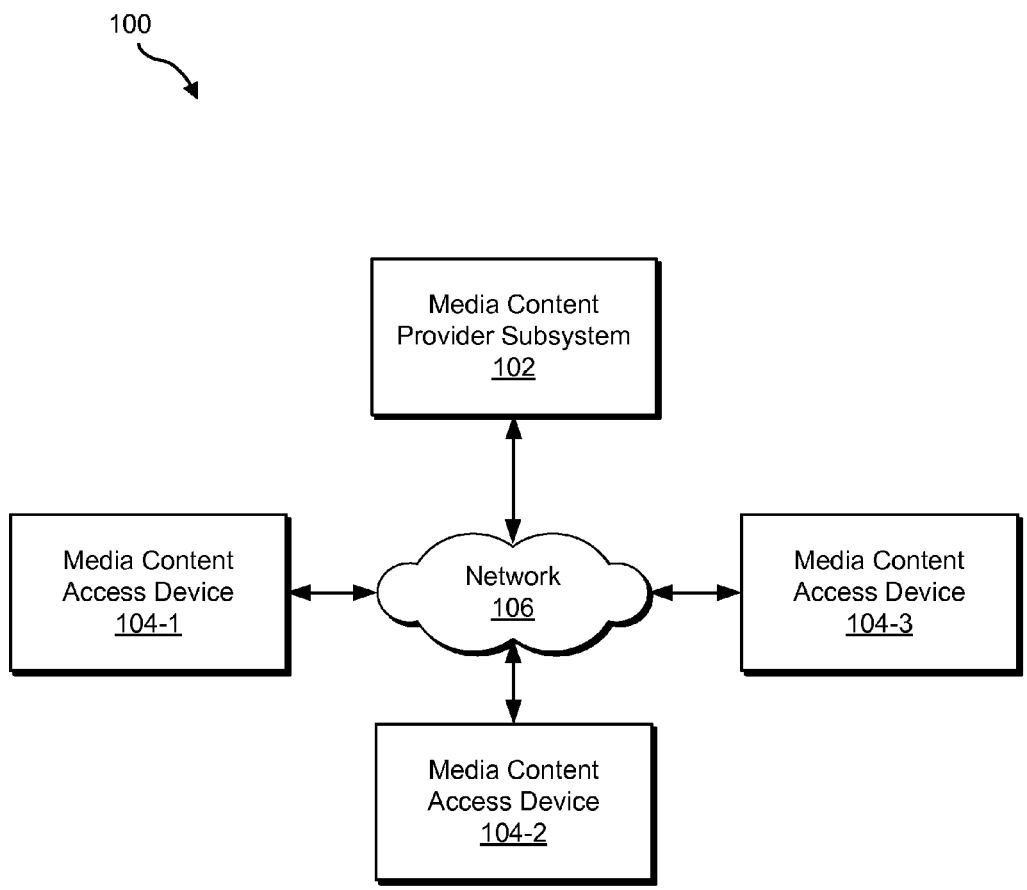
FIG. 1 illustrates an exemplary media content session management system according to principles described herein.

Exemplary methods and systems for managing media content sessions are disclosed herein. As described in more detail below, an exemplary method may include a media content access device detecting a media content session associated with the media content access device, communicating with one or more other media content access devices interconnected with the media content access device by way of a local area network ("LAN") to detect one or more other media content sessions associated with the one or more other media content access devices, and presenting a graphical user interface configured to facilitate user management of the detected media content sessions. Additional or alternative methods and systems for managing media content sessions are also disclosed herein.

As will be described in more detail below, the methods and systems disclosed herein may be configured to allow a user to dynamically access, manage, and/or control one or more active media content sessions associated with a plurality of media content access devices interconnected by way of a LAN. To illustrate, a user may utilize the methods and systems disclosed herein to actively manage, access, and/or control active media content sessions associated with access devices within the user's home and interconnected by way of a home network. In some examples, the user can manage all of the active media content sessions from a single media content access device. As a result, the user can utilize a single media content access device within the user's home to actively monitor and control what media content is being presented within the user's home, where it is being presented, and/or when it is being presented. In some examples, the methods and systems disclosed herein may additionally or alternatively allow a user to selectively access, share, and/or shift any active media content session, as will be explained in more detail below. Additional benefits and advantages will be apparent from the details disclosed herein.

As used herein, "media content" may refer generally to any content accessible via a media content access device. The term "media content instance" will be used herein to refer to any television program, on-demand media program, pay-per-view media program, broadcast media program (e.g., broadcast television program), multicast media program (e.g., multicast television program), narrowcast media program (e.g., narrowcast video-on-demand program), IPTV media content, advertisement (e.g., commercial), video, movie, song, image, photograph, sound, or any segment, component, or combination of these or other forms of media content that may be processed by a media content access device for experiencing by a user.

As used herein, "media content session," "media session," and "session" may refer to any presentation, recording, and/or other processing of media content. For example, a media content session may include a presentation of one or more media content instances or a portion thereof (e.g., a presentation of a live television broadcast stream associated with a television broadcast service provider), a playback of one or more previously recorded media content instances (e.g., one or more DVR recordings, DVDs, Blu-rays, etc.) or a portion thereof, a recording of one or more media content instances (e.g., a DVR recording of a live television broadcast stream), a tuning to one or more media content instances, and/or any other suitable processing and/or presenting of media content. In some examples, a single media content access device may be simultaneously associated with (e.g., process, access, present, etc.) a plurality of active media content sessions. For example, a single media content access device may simultaneously process and/or record a first media content instance received by way of a first tuner, process and/or record a second media content instance received by way of a second tuner, and/or play back a third media content instance that was previously recorded.

As mentioned above, a media content session may be associated with (e.g., processed by) a corresponding media content access device. As used herein, "media content access device" and "access device" may refer to any suitable computing device configured to process and/or present media content. For example, a media content access device may perform one or more steps associated with the presentation, playback, recording, streaming, and/or processing of media content. An exemplary media content access device may include, but is not limited to, a set-top box device, a DVR device, a media content processing device, a communications device, a mobile access device (e.g., a mobile phone device, a handheld device, a laptop computer, a tablet computer, a personal-digital assistant device, a camera device, etc.), a personal computer, a gaming device, a television device, a combination thereof, and/or any other device configured to perform one or more of the processes and/or operations described herein. In some examples, a plurality of media content access devices may be interconnected by and/or configured to transmit/receive data over a local area network ("LAN"), as will be explained in more detail below. Additionally or alternatively, in certain implementations, a plurality of media content access devices may include at least one set-top box device and a set-top box companion device, such as a tablet computer or other mobile access device configured to function as a companion to the set-top box device.

As mentioned above, in some examples, a plurality of media content access devices may be interconnected and/or capable of communicating with one another by way of a LAN. As used herein, "local area network" and "LAN" may refer to any suitable network that interconnects media content access devices within a limited local geographical area and/or without the use of leased telecommunications lines. For example, a LAN may interconnect media content access devices within a home, a school, or an office. A LAN may utilize any suitable wired and/or wireless communication technologies, such disclosed herein, to facilitate communication between multiple media content access devices interconnected by way of the LAN.

FIG. 1 illustrates an exemplary media content session management system 100 (or simply "system 100"). As will be described in more detail below, system 100 may be configured to facilitate access to, management of, and/or control of one or more media content sessions. As shown in FIG. 1, system 100 includes a media content provider subsystem 102 (or simply "provider subsystem 102") communicatively coupled to media content access devices 104-1 through 104-3 (collectively referred to herein as "access devices 104") by way of a network 106.

Provider subsystem 102 and/or access devices 104 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, provider subsystem 102 may communicate with access devices 104 via a network 106, which may include one or more networks, including, but not limited to, wireless communication networks (e.g., 3G and 4G networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, LANs, wide area networks (WANs), video service networks, subscriber television networks, and any other networks capable of carrying data and/or communications signals between provider subsystem 102 and access devices 104. Communications between provider subsystem 102 and access devices 104 may be transported using any one of the above-listed networks, or any combination or sub-combination of the above-listed networks.

In some examples, network 106 may include a LAN, and two or more of access devices 104 may be interconnected and/or communicate with each other via the LAN. For example, the LAN may be associated with a user of access devices 104 and set up within the user's home or office. In some examples, some communications between access devices 104 may be confined to the LAN.

Provider subsystem 102 may be configured to generate or otherwise provide media content (e.g., in the form of one or more media content streams including one or more media content instances) to access devices 104. Although a single provider subsystem 102 is shown in FIG. 1, one will appreciate that system 100 may include any suitable number of provider subsystems. In some examples, each of access devices 104 may communicate and/or be associated with a different provider subsystem and/or media content provider.

In some examples, provider subsystem 102 may communicate with access devices 104 by way of a LAN associated with access devices 104. Additionally or alternatively, provider subsystem 102 may bypass the LAN and/or directly connect to access devices 104 without going through a LAN.

Access devices 104 may be configured to facilitate access by a user to media content made available by provider subsystem 102. To this end, access devices 104 may present (e.g., by way of a display screen or display device associated with and/or included in an access device 104) a media content instance for experiencing (e.g., viewing) by the user, facilitate the recording of a media content instance for later playback by the user, present a GUI to the user, parse metadata and/or other data associated with the media content, etc. Presentation of the media content may include, but is not limited to, displaying, playing, or otherwise presenting the media content, or one or more components of the media content, such that the media content may be experienced by the user.

In some examples, each of access devices 104 may be authenticated as being associated with a user and/or a corresponding subscription to media content programming. Access devices 104 may be authenticated in any suitable manner. For example, a user may authenticate an access device 104 by providing a unique username and password associated with the user.

Provider subsystem 102 may be implemented by one or more computing devices. For example, provider subsystem 102 may be implemented by one or more server devices. Additionally or alternatively, access devices 104 may be implemented as may suit a particular implementation. For example, each of access devices 104 may be implemented by any suitable media content access device, such as disclosed herein. In some examples, each access device 104 may include and/or be associated with an input device (e.g., a touch screen, a remote control device, a mouse, a keyboard, or any other suitable input device) configured to allow a user to interact with and provide user input to the access device 104.

In some examples, each of access devices 104 may be configured to facilitate user management of media content sessions associated with access devices 104. For example, each access device 104 may be configured to detect a media content session or multiple media content sessions associated with the access device 104. To illustrate, each access device 104 may be configured to detect a presentation of a media content program (e.g., a television program) by the access device 104. The access device 104 may be configured to detect the media content session in any suitable manner, such as by accessing information indicative of any and/or all media content programs currently being presented by the access device 104, for example.

Additionally or alternatively, each access device 104 may be configured to communicate with other access devices 104 by way of network 106 to detect media content sessions associated with the other access devices 104. For example, access devices 104 may each be configured to transmit a request for active session data (e.g., data representative of active media content sessions and/or corresponding information) to one or more other access devices 104 over network 106, to receive a request for active session data from one or more other access devices 104 over network 106, to respond to a request for active session data by providing (e.g., transmitting) the requested active session data over network 106, and/or to transmit/receive any other suitable communications/data configured to facilitate the detection of media content sessions associated with access devices 104. Additionally or alternatively, access devices 104 may be configured to transmit/receive any other suitable data (e.g., media content data, parental control data, message data, etc.) to/from each other by way of network 106, as will be explained in more detail below.

To illustrate the foregoing, in one exemplary embodiment, access device 104-1 may detect a first media content session associated with access device 104-1 (e.g., a presentation of a television program by access device 104-1); communicate with access devices 104-2 and 104-3 (e.g., transmit active session data requests to and/or receive active session data from access devices 104-2 and 104-3) to detect a second media content session associated with access device 104-2 (e.g., a presentation of a previously recorded movie by access device 104-2) and a third media content session associated with access device 104-3 (e.g., an active recording of a live television broadcast by access device 104-3); and then aggregate data representative of all the detected media content sessions to facilitate user management thereof. In additional or alternative examples, access devices 104 may be configured to detect active media content sessions in any other suitable manner.

Each of access devices 104 may be configured to generate, manage, provide, and/or present (e.g., by way of a display device) a graphical user interface ("GUI") configured to facilitate user management of active/detected media content sessions and/or the corresponding access devices 104. In some examples, the GUI may include media content (e.g., video, images, etc.) associated with each media content session, information (e.g., a title, a description, a maturity rating, a user rating, a start/stop time, a length, a cast, a genre, a source, a broadcast channel, etc.) associated with each media content session, and/or any other suitable information/content.

Additionally or alternatively, the GUI may include one or more options configured to allow a user to manage, access, and/or control the active media content sessions and/or corresponding access devices 104. For example, the GUI may include selectable options configured to allow a user to selectively access an active media content session (e.g., to allow a user of access device 104-1 to selectively access a media content session associated with access device 104-2 or access device 104-3), share one or more active media content sessions (e.g., to allow a user of access device 104-1 to share a corresponding media content session with a user of access device 104-2 or access device 104-3), shift one or more active media content sessions from one access device 104 to another access device 104 (e.g., to allow a user to shift a media content session associated with access device 104-1 to access device 104-2 or access device 104-3), restrict one or more active media content sessions and/or corresponding access devices 104 (e.g., to allow a user of access device 104-1 to provide one or more parental control parameters to restrict a media content session associated access device 104-2 or access device 104-3), lock one or more media content sessions (e.g., to allow a user of access device 104-1 to lock a media content session associated with any of access devices 104), remotely control one or more media content sessions (e.g., to allow a user of access device 104-1 to remotely control access device 104-2, access device 104-3, and/or a corresponding media content session), send one or more messages from one access device 104 to another access device 104 (e.g., to allow a user of access device 104-1 to send a message to access device 104-2 or access device 104-3 for display to a user of access device 104-2 or access device 104-3), and/or perform any other suitable operations associated with the management, access, and/or control of detected media content sessions or access devices 104, as will be explained in more detail below.

A user may utilize any suitable input device (e.g., a remote control device, a touch screen, etc.) to interact with the GUI and/or manage detected media content sessions. To illustrate, a user may utilize a touch screen to provide one or more touch gestures to interact with information, content, and/or options included within the GUI.

Figure 2:
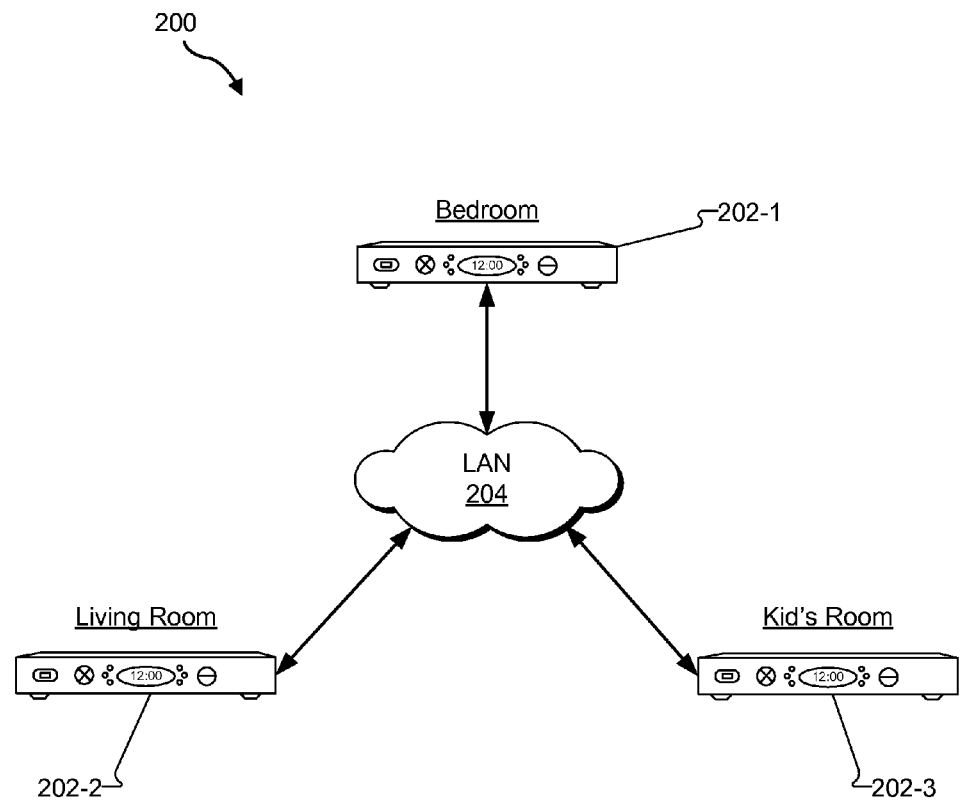
FIG. 2 illustrates an exemplary implementation of the system of FIG. 1 according to principles described herein.

FIG. 2 illustrates an exemplary implementation 200 of system 100 wherein a plurality of set-top box devices 202-1 through 202-3 (collectively referred to herein as "STB devices 202") are communicatively coupled to each other by way of a LAN 204. Each of STB devices 202 may include any suitable set-top box device or similar media content access device. Additionally or alternatively, LAN 204 may include any suitable LAN, such as disclosed herein. To illustrate, LAN 204 may include a home network associated with a user, and each of STB devices 202 may be associated with and located within a particular room of the user's home. For example, as shown in FIG. 2, STB device 202-1 may be located in or otherwise associated with a "Bedroom" in the user's home, STB device 202-2 may be located in or otherwise associated with a "Living Room" in the user's home, and STB device 202-3 may be located in or otherwise associated with a "Kid's Room" in the user's home. Each of STB devices 202 may be configured to access media content made available by one or more corresponding media content providers, stored on one or more storage media (e.g., a hard-drive, a DVD disc, a Blu-ray disc, etc.), and/or otherwise accessible by STB devices 202. Implementation 200 is provided and utilized herein for illustrative purposes only and is not limiting. In additional or alternative examples, the methods and systems disclosed herein may be implemented in any other suitable manner. For example, the types of media content access devices utilized, the locations of the media content access devices, the number of media content access devices, the type and location of the LAN, and/or any other suitable aspect of implementation 200 may be modified in any suitable manner as may serve a particular implementation.

STB devices 202 may be configured to perform any of the operations, processes, and/or methods disclosed herein. For example, STB devices 202 may each include a client (e.g., a client application) implementing one or more features disclosed herein.

To illustrate the foregoing, STB device 202-1 may be configured to detect an active media content session associated with STB device 202-1. Additionally or alternatively, STB device 202-1 may be configured to communicate with STB devices 202-2 and 202-3 by way of LAN 204 to detect and/or receive data representative of active media content sessions associated with STB devices 202-2 and 202-3. STB device 202-1 may then aggregate data and information associated with all the detected media content sessions to facilitate management of the active media content sessions by a user. Although this example refers to STB device 202-1 as receiving and/or aggregating the data associated with the detected media content sessions, in certain implementations, the same process may be performed by STB devices 202-2 and 202-3, such that each STB device 202 has access to and/or is configured to detect media content sessions associated with every other STB device 202 connected to LAN 204.

Figure 3:
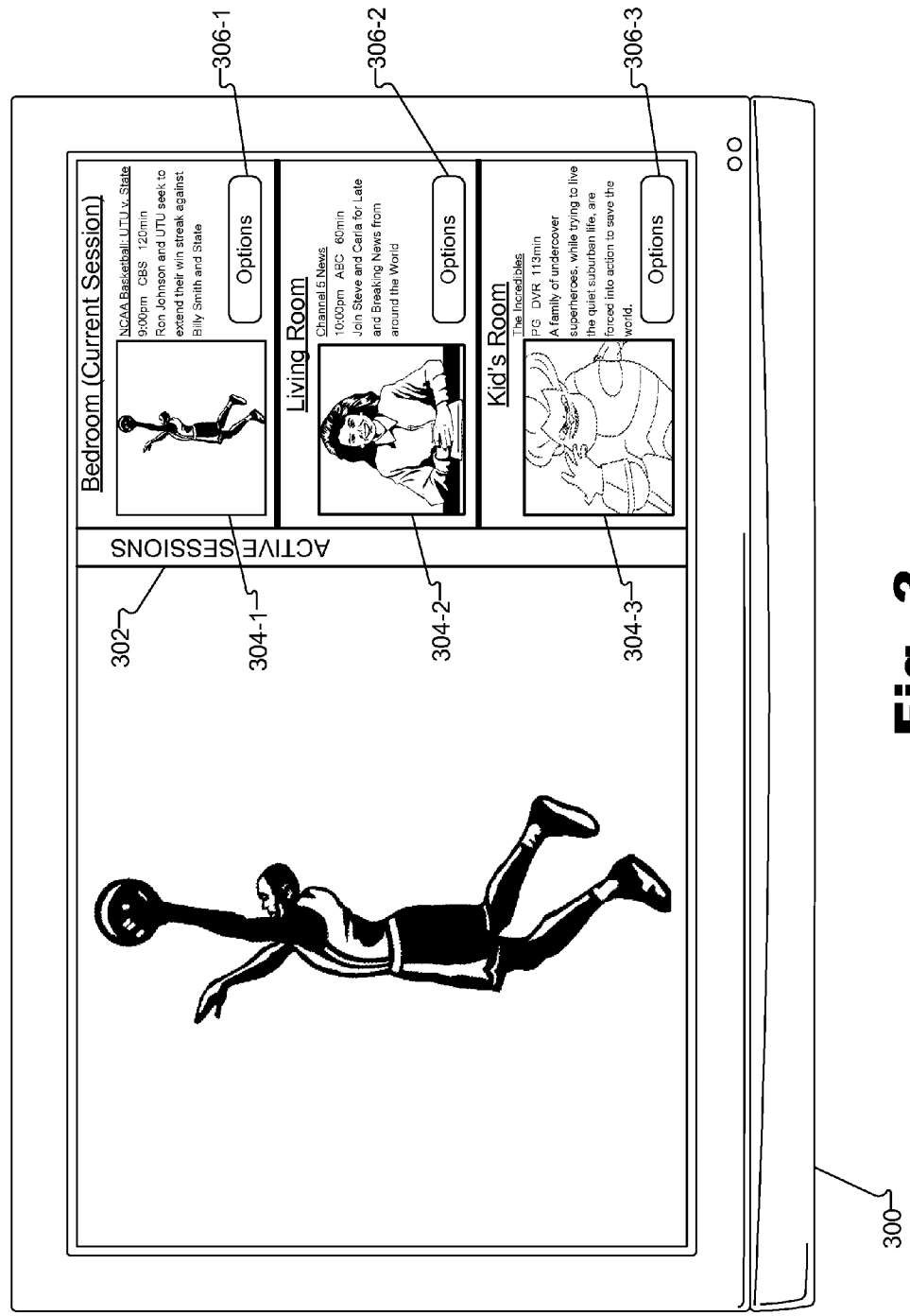
FIGS. 3-9 illustrate exemplary embodiments of graphical user interface views associated with managing of media content sessions according to principles described herein.

Each of STB devices 202 may be additionally or alternatively configured to generate, provide, manage, and/or otherwise provide a GUI configured to facilitate user management of the detected media content sessions and/or STB devices 202. For example, each of STB devices 202 may be configured to present a GUI configured to facilitate the management of STB devices 202 and/or any active media content sessions associated with STB devices 202. To illustrate, FIG. 3 shows a display device 300 that may include or be communicatively coupled to STB device 202-1 and directed by STB device 202-1 to present a graphical user interface 302 (or "GUI 302") configured to facilitate management of one or more "Active Sessions" associated with STB devices 202. For example, as shown in FIG. 3, GUI 302 may be configured to facilitate the management of a session 304-1 including a presentation of a media content instance titled "NCAA Basketball: UTU v. State" by STB device 202-1 in the "Bedroom," a session 304-2 including a presentation of a media content instance titled "Channel 5 News" by STB device 202-2 in the "Living Room," and/or a session 304-3 including a presentation of a movie titled "The Incredibles" by STB device 202-3 in the "Kid's Room" (sessions 304-1 through 304-3 may be collectively referred to herein as "sessions 304"). Although FIG. 3 shows GUI 302 as a partial screen GUI, one will appreciate that GUI 302 may additionally or alternatively be a full screen GUI.

In some examples, GUI 302 may include image and/or video content (e.g., real-time video content) from sessions 304, information (e.g., a start time, a duration, a rating, a description, a source, and/or any other suitable information) associated with sessions 304, and/or one or more selectable options 306-1 through 306-3 (collectively referred to herein as "selectable options 306") configured to allow a user to access one or more functional options associated with the sessions 304.

Figure 4:
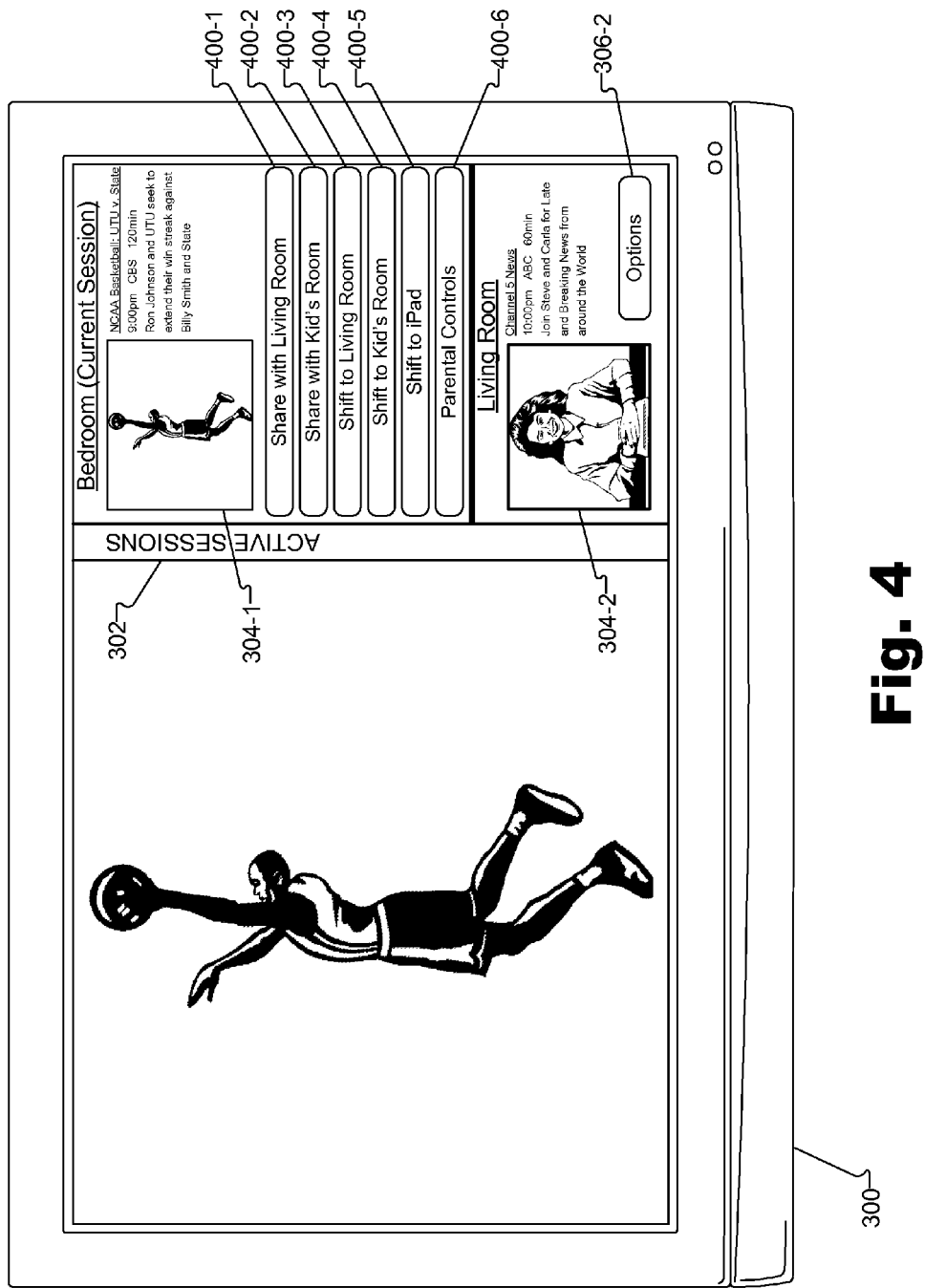

To illustrate, FIG. 4 shows a view of GUI 302 after a user has selected option 306-1 to access additional options associated with session 304-1. As shown in FIG. 4, GUI 302 now includes selectable options 400-1 through 400-6 (collectively referred to herein as "options 400"). Selectable options 400 may be configure to allow a user to initiate performance of any suitable operations associated with session 304-1. For example, option 400-1 may be configured to allow the user to "Share" session 304-1 "with Living Room," option 400-2 may be configured to allow the user to "Share" session 304-1 "with Kid's Room," option 400-3 may be configured to allow the user to "Shift" session 304-1 "to Living Room," option 400-4 may be configured to allow the user to "Shift" session 304-1 "to Kid's Room," option 400-5 may be configured to allow the user to "Shift" session 304-1 to a set-top box companion device, such as an "iPad," and option 400-6 may be configured to allow the user to provide and/or configure one or more "Parental Controls." Options 400 are provided for illustrative purposes only. GUI 302 may include any additional and/or alternative options configured to allow a user to initiate performance of any suitable operations associated with a media content session.

As used herein, the term "sharing a media content session" may include a first media content access device sharing a media content session with a second media content access device, such that both access devices can simultaneously access, process, and/or present the media content associated with the media content session. For example, a first access device may share a media content session with a second access device by transmitting data representative of a corresponding media content instance to the second access device (e.g., by way of a LAN) or directing the second access device to independently access the media content instance (e.g., by tuning to and/or otherwise accessing the media content from a corresponding media content provider), after which both access devices may present the media content substantially simultaneously. In some examples, a second media content device may present the shared session as it is being presented and/or controlled by way of the first media content access device. For example, a first user may utilize one or more DVR functionalities and/or trick plays to control (e.g., rewind, pause, fast-forward, etc.) the presentation of the shared media content session and the second user may experience the media content in accordance with the first user's controls (e.g., the presentation for the second user may mirror the presentation for the first user, as if the second user and the first user were watching the same screen).

Figure 5:
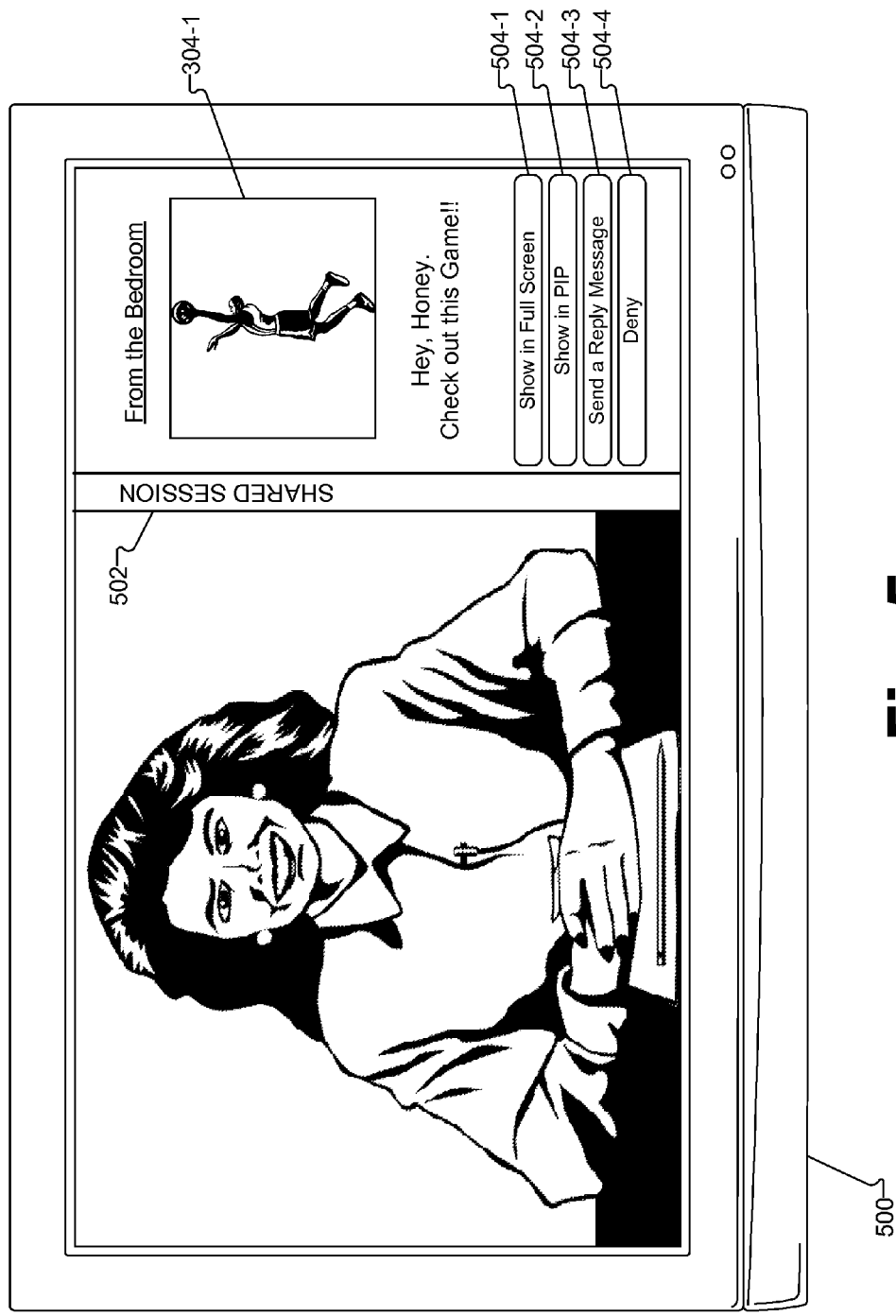

To illustrate the foregoing, a user watching the presentation of session 304-1 in the bedroom may wish to share session 304-1 with another user who is watching television in the living room. Accordingly, the user may select option 400-1 to share session 304-1 with the living room, after which STB device 202-1 may share session 304-1 with STB device 202-2. FIG. 5 shows another display device 500 that may include and/or be communicatively coupled to STB device 202-2 and/or utilized to present session 304-2. As shown in FIG. 5, in response to the user's selection of option 400-1, display device 500 may display a notification 502 configured to notify a user watching display device 500 that the user in the bedroom is trying to share session 304-1 with the user in the living room. In some examples, notification 502 may be accompanied by a message from the user in the bedroom. For example, the user in the bedroom may utilize a remote control device to input the message "Hey, Honey. Check out this game!!" after which the message may accompany and/or be delivered by way of notification 502 to the user in the living room. Additionally or alternatively, notification 502 may include one or more selectable options 504-1 through 504-4 (collectively referred to herein as "options 504") configured to allow the user to initiate performance of one or more operations associated with the shared session. For example, selectable option 504-1 may be configured to allow the user to "Show" media content session 304-1 "in Full Screen," selectable option 504-2 may be configured to allow the user to "Show" media content session 304-1 in a picture-in-picture ("PIP") window, selectable option 504-3 may be configured to allow the user to "Send a Reply Message" to the user in the bedroom, and selectable option 504-4 may be configured to allow the user to "Deny" the shared media content session and continue watching session 304-2 uninterrupted.

Figure 6:

To illustrate the foregoing, the user in the living room may select selectable option 504-2 to watch session 304-1 by way of a PIP window displayed in conjunction with the continued presentation of session 304-2. As shown in FIG. 6, in response to a selection by the user of selectable option 504-2, display device 500 may be directed to present session 304-1 within a PIP window. Accordingly, the user in the living room can simultaneously experience both session 304-1 and session 304-2. In additional or alternative examples, a media content session may be shared in any other suitable manner as may serve a particular implementation.

Returning to FIG. 4, and as mentioned above, GUI 302 may be configured to allow a user to shift (e.g., by way of options 400-3 through 400-5) a media content session from one access device to another. As used herein, the term "shifting a media content session" may include one access device discontinuing the media content session (e.g., discontinuing a presentation of the media content session) and directing another access device to resume the media content session (e.g., resume the presentation of the media content session). For example, a first access device may shift a media content session to a second access device by transmitting data representative of the corresponding media content to the second access device or directing the second access device to independently access the media content, after which the first access discontinues a presentation of the media content and the second access device resumes the presentation of the media content, as will be explained in more detail below.

As also mentioned above, GUI 302 may be configured to allow a user to provide one or more parental control parameters (e.g., by way of option 400-6) configured to restrict one or more of sessions 304 and/or STB devices 202. The parental control parameters may be configured to restrict a media content session and/or media content access device in any suitable manner. For example, the parental control parameters may be configured to restrict a presentation of media content instances having a certain rating (e.g., a maturity rating), restrict a presentation of media content instances after/before a certain time of day (e.g., after a child's bedtime), restrict a presentation of media content for longer than a certain duration of time, and/or restrict the presentation and/or access of media content in any other suitable manner. In some examples, one or more parental control parameters may be limited to a particular media content access device (e.g., STB device 202-3 associated with "Kid's Room") or may be uniformly applied to all STB devices 202. In additional or alternative examples, a user may configure one or more media content access devices to require separate entry of a PIN prior to presenting any media content instance. Accordingly, a parent can utilize the PIN to unlock a particular media content instance (e.g., a kid-friendly television program) for a child, after which the child may utilize the media content access device to experience the media content instance. However, all remaining media content instances may remain locked, thereby preventing the child from navigating to another media content instance during or after the presentation of the unlocked media content instance. In additional or alternative examples, system 100 may be configured to allow a parent to provide parental control parameters and/or restrict media content sessions/access devices in any other suitable manner.

Figure 7:
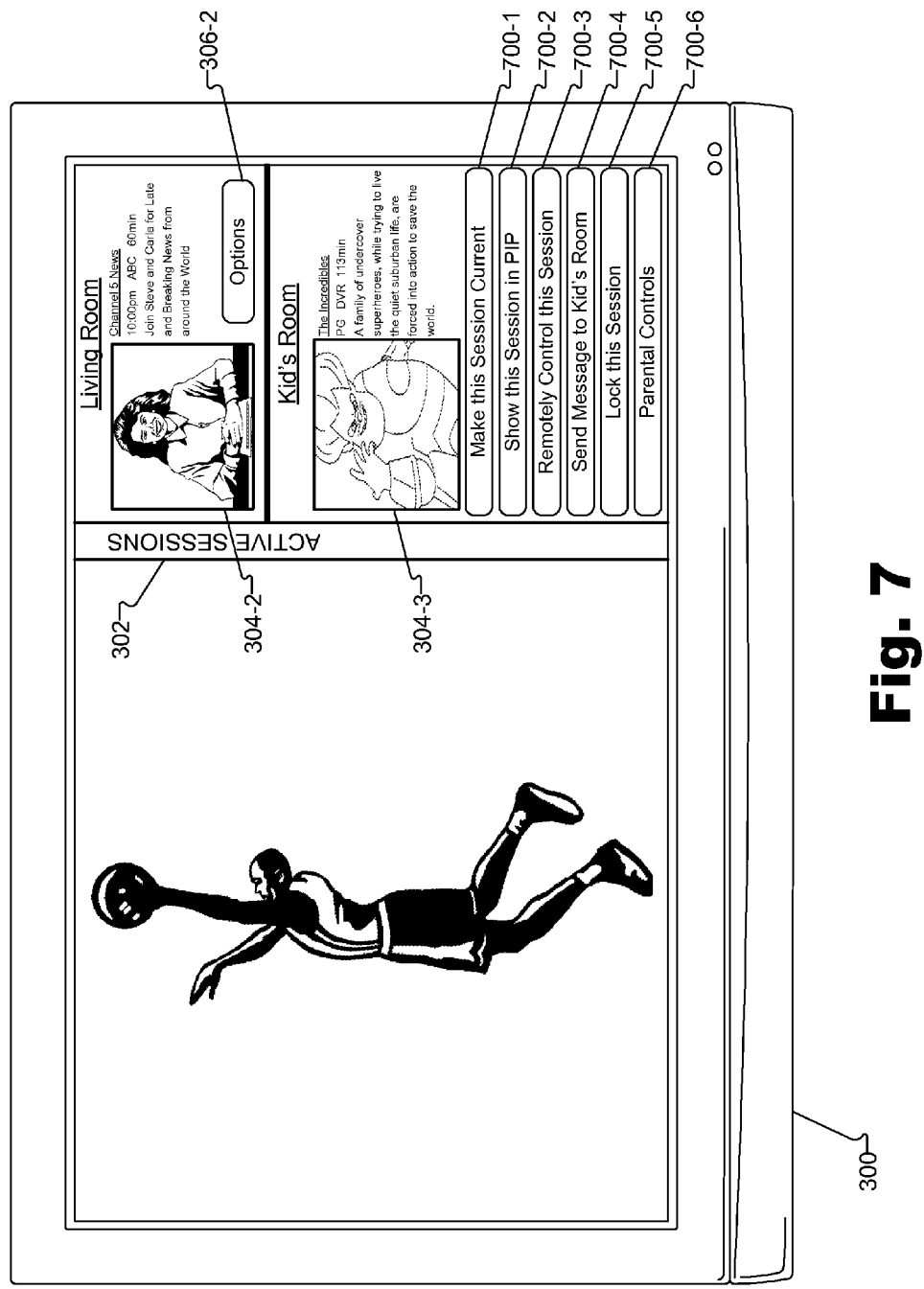

Returning to FIG. 3, a user may utilize selectable options 306-2 and 306-3 to access options associated sessions 304-2 and 304-3 respectively associated with STB devices 202-2 and 202-3. To illustrate, as shown in FIG. 7, in response to a user selection of selectable option 306-3 shown in FIG. 3, GUI 302 may be modified to include selectable options 700-1 through 700-6 (collectively referred to herein as "selectable options 700") associated with session 304-3 and/or STB device 202-3. For example, selectable option 700-1 may be configured to allow a user to "Make" session 304-3 the "Current Session" (e.g., to access session 304-3), selectable option 700-2 may be configured to allow a user to "Show" session 304-3 in a "PIP" window, selectable option 700-3 may be configured to allow a user to "Remotely Control" session 304-3, selectable option 700-4 may be configured to allow a user to "Send Message to Kid's Room," selectable option 700-5 may be configured to allow a user to "Lock this Session" (e.g., to prevent a user in kid's room from continuing to watch session 304-3 and/or to prevent the user in kid's room from watching any additional media content instances, as explained above), and/or selectable option 700-6 may be configured to allow a user to provide one or more "Parental Controls" to selectively restrict session 304-3 and/or STB device 202-3. Additionally or alternatively, GUI 302 may include any other suitable options associated with session 304-3 and/or STB device 202-3.

Figure 8:
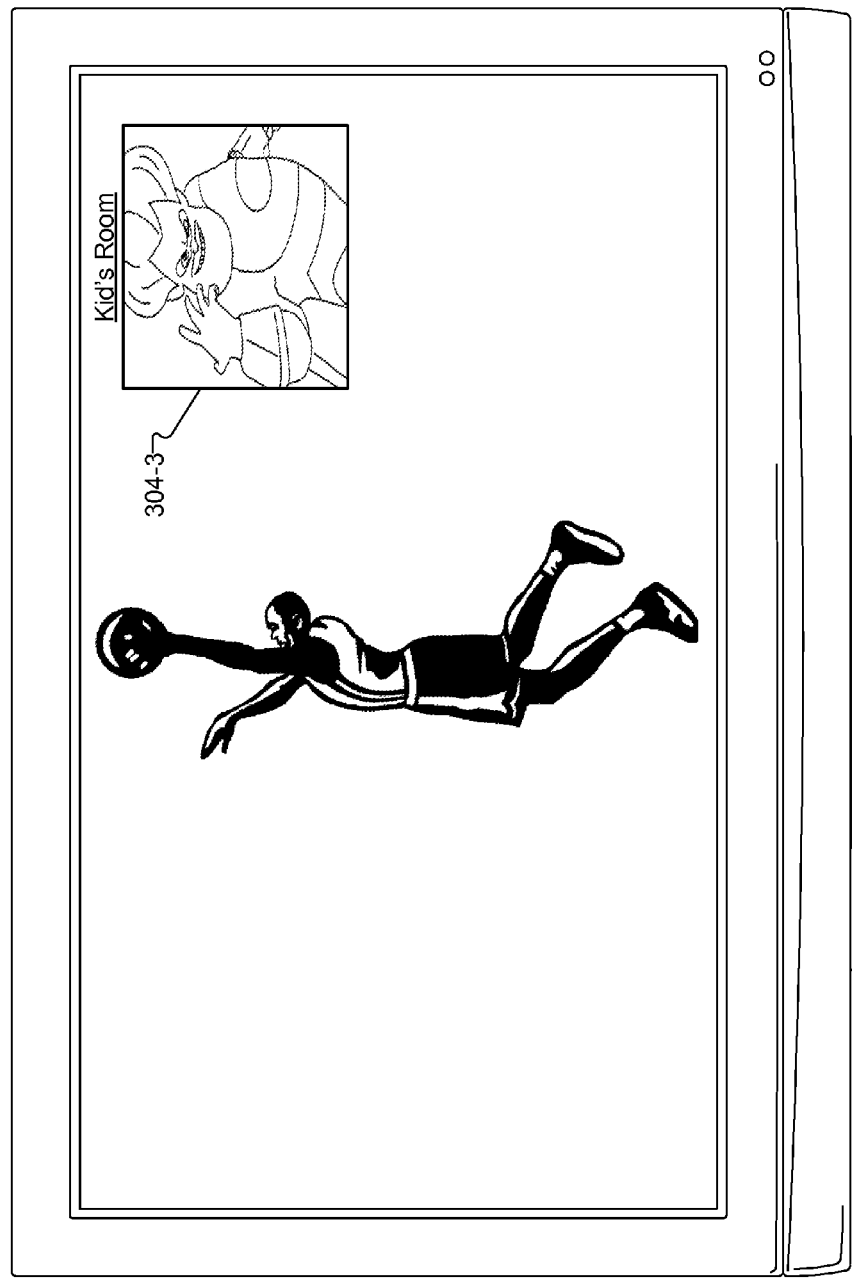

To illustrate the foregoing, a user in the bedroom may desire to show session 304-3 on display device 300 in order to monitor what is being watched in the kid's room. Accordingly, for example, the user may select selectable option 700-2 to present session 304-3 by way of a PIP window displayed by display device 300, as shown in FIG. 8. As a result, the user in the bedroom may continue to experience session 304-1 while monitoring session 304-3. In some examples, the presentation of session 304-3 by way of display device 300 in the bedroom may be in accordance with one or more controls provided by a user of STB device 302-3 in the kid's room. Accordingly, a presentation of session 304-3 within the bedroom may mirror a presentation of session 304-3 in the kid's room. For example, as the user in the kid's room changes the channel, pauses the playback of the media content, accesses additional media content, and/or changes or controls session 304-3 in any other suitable manner, both the presentation of session 304-3 in the kid's room and the presentation of session 304-3 in the bedroom may be changed in accordance with the controls provided by the user in the kid's room. This way, for example, a parent may actively monitor what his/her child is watching without having to leave his/her own bedroom and despite any changes to the child's media content session.

Figure 9:
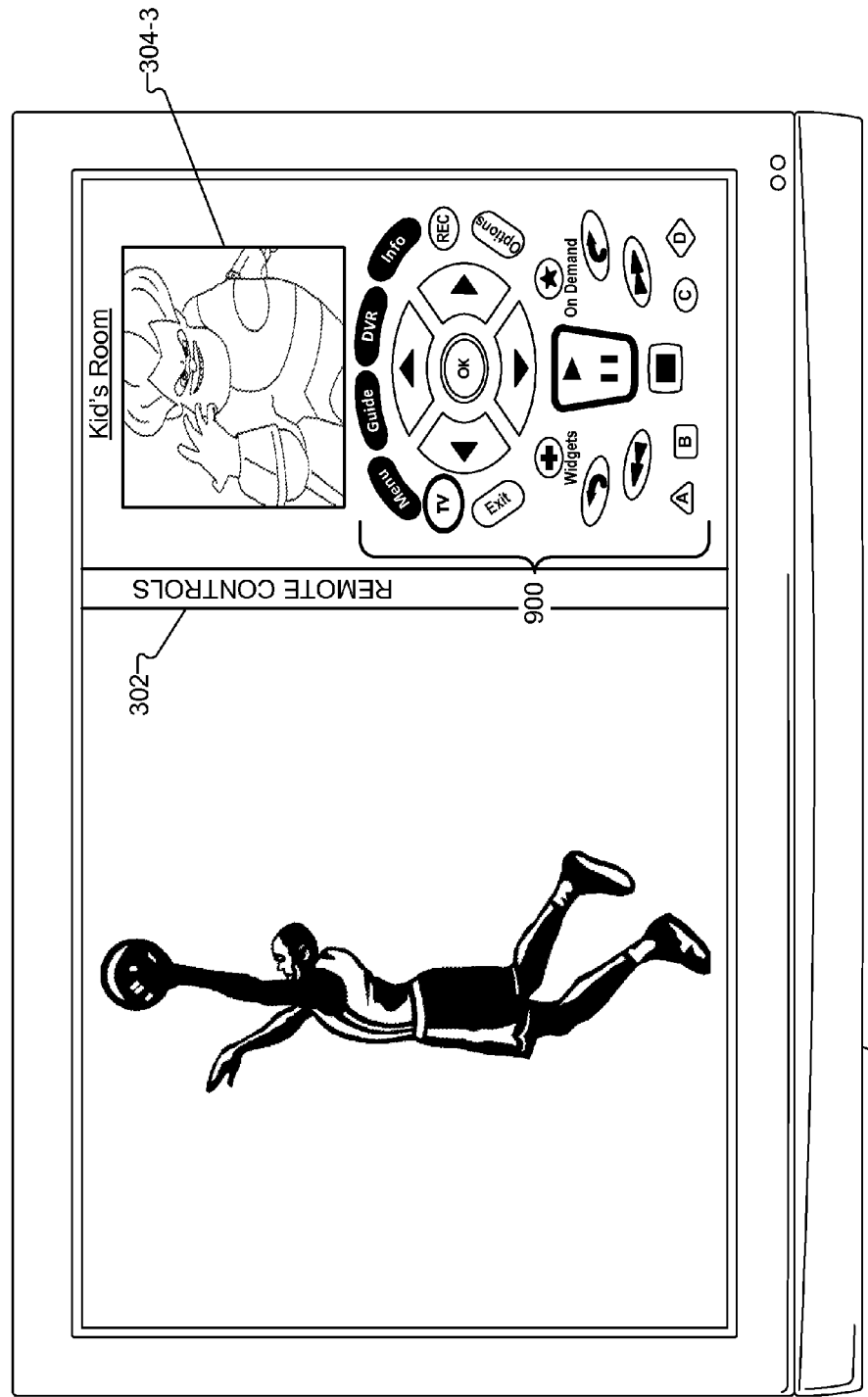

Returning to FIG. 7, a user may select selectable option 700-3 to allow the user to remotely control session 304-3. For example, as shown in FIG. 9, in response to a user selection of selectable option 700-3 shown in FIG. 7, GUI 302 may be updated to include one or more remote control options 900 configured to allow the user to remotely control session 304-3. For example, the user may utilize options 900 to pause the presentation, change the channel, access another media content instance, and/or remotely control session 304-3 in any other suitable manner.

FIGS. 4-9 are provided for illustrative purposes only and are not limiting. One will appreciate that additional or alternative implementations of the methods and systems disclosed herein may omit, add to, and/or modify any features illustrated in FIGS. 4-9 as may serve a particular implementation.

Figure 10A:
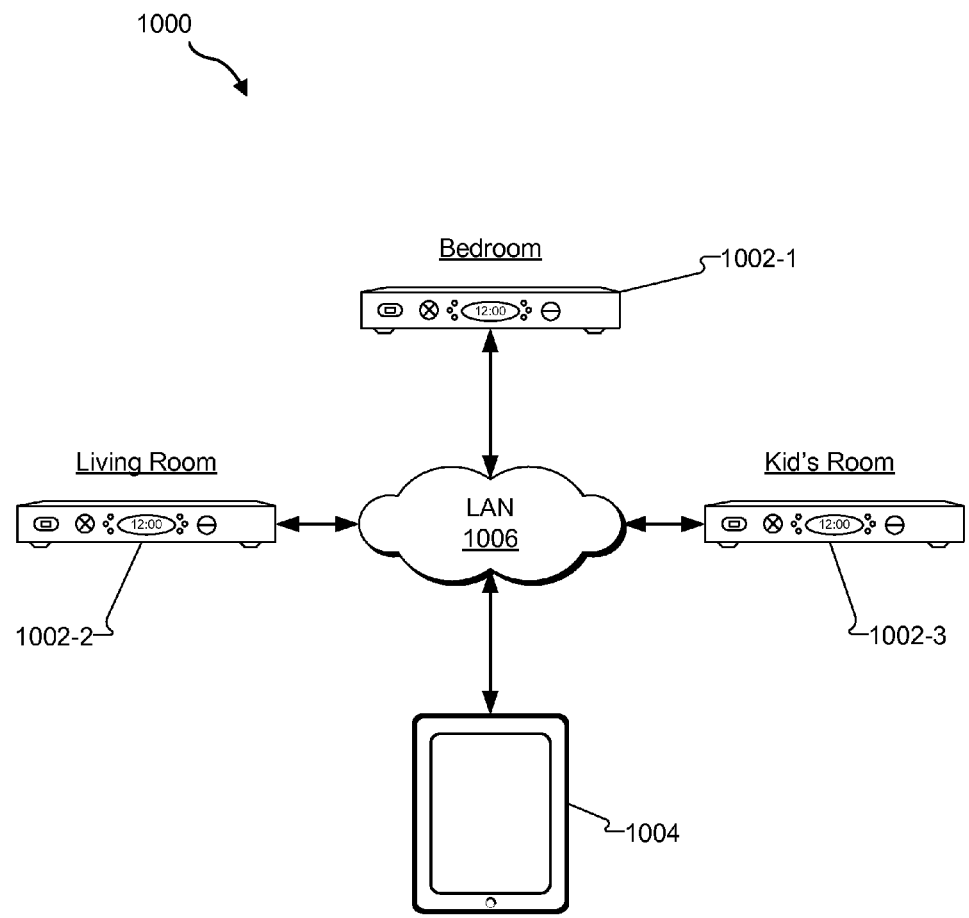
FIGS. 10A-10B illustrate another exemplary implementation of the system of FIG. 1 according to principles described herein.
Figure 10B:
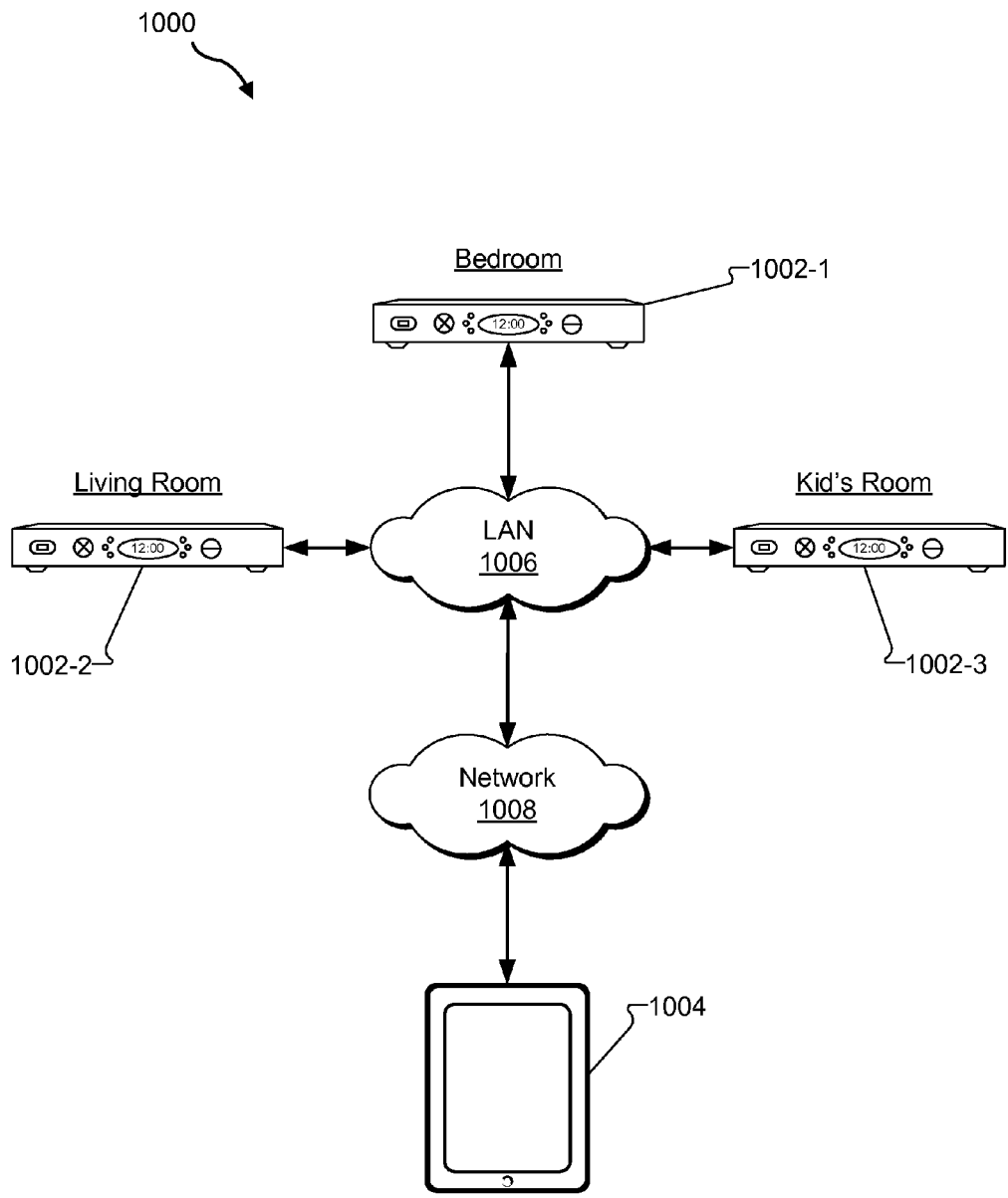

FIGS. 10A-10B illustrate another exemplary implementation 1000 of system 100 wherein a plurality of STB devices 1002-1 through 1002-3 (collectively referred to herein as "STB devices 1002") and a mobile device 1104 are communicatively coupled to each other by way of a LAN 1006. As shown in FIGS. 10A-10B, in some examples, mobile device 1004 may include a tablet computer and/or be configured to operate as an STB companion device. For ease of illustration, implementation 1000 may be similar in many ways to implementation 200 and certain features of implementation 1000 may not be described in relation to implementation 1000 as they are described above in relation to implementation 200.

In some examples, mobile device 1004 may be configured to detect active media content sessions associated with STB devices 1002 by way of LAN 1006. For example, mobile device 1004 may be configured to communicate with STB devices 1002 by way of LAN 1006 to detect active media content sessions associated with STB devices 1002. Additionally or alternatively, mobile device 1004 may be configured to present a GUI to facilitate management of the detected media content sessions.

In some examples, mobile device 1004 may be directly connected to LAN 1006, as shown in FIG. 10A. For example, LAN 1006 may comprise a home network associated with a user's home and mobile device 1004 may directly connect to LAN 1006 when mobile device 1004 is located within or near the user's home.

Additionally or alternatively, as shown in FIG. 10B, mobile device 1004 may connect to STB devices 1002 and/or LAN 1006 by way of another network 1008. Network 1008 may comprise any suitable network or combination of networks (e.g., a WAN, a 3G network, a 4G network, the Internet, a Wi-Fi hotspot, etc.). In some examples, mobile device 1004 may communicate with STB devices 1002 and/or LAN 1006 by way of network 1004 despite being located remotely from STB devices 1002 and LAN 1006. As a result, for example, a user may manage media content sessions associated with STB devices 1002 by way of mobile device 1004 regardless of the user's location.

Figure 11:
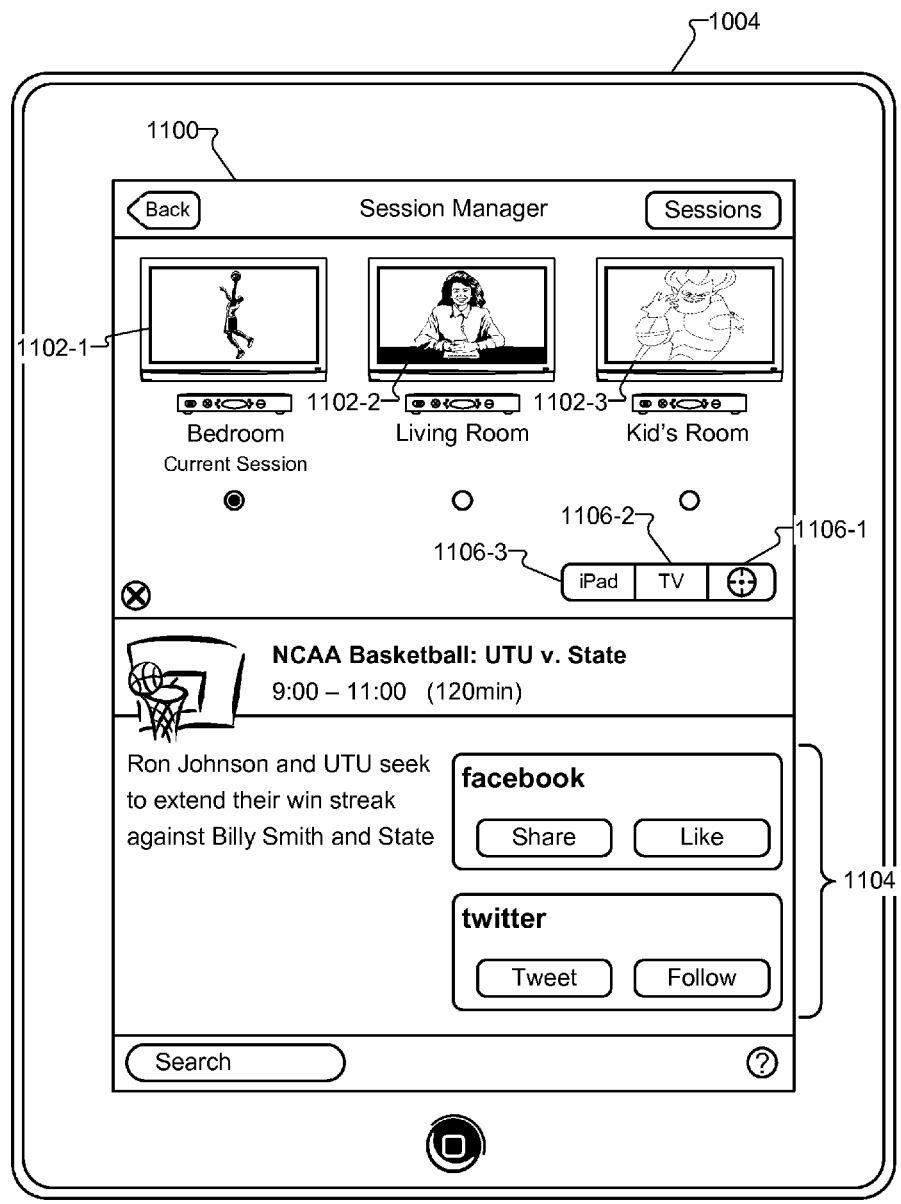
FIG. 11-16 illustrate additional exemplary embodiments of graphical user interface views associated with managing of media content sessions according to principles described herein.

FIG. 11 illustrates an exemplary view of mobile device 1004 presenting a GUI 1100 configured to facilitate user management of active media content sessions 1102-1 through 1102-3 (collectively referred to herein as "sessions 1102") associated with STB devices 1002. In some examples, a user may utilize GUI 1100 to select (e.g., by way of a touch screen) one of sessions 1102 to make the session "current" on mobile device 1004 (e.g., to access information, content, and/or options associated with the selected session by way of GUI 1100). For example, as shown in FIG. 11, after a user has selected one of sessions 1102, GUI 1100 may include content, information, and/or options associated with the selected session. In some examples, GUI 1100 may include one or more social media options 1104 configured to allow a user to interact with one or more corresponding social media outlets in relation to the media content session.

Additionally or alternatively, GUI 1100 may include one or more navigation options 1106-1 through 1106-3 (collectively referred to herein as "navigation options 1106"). Each of navigation options 1106 may be configured to allow the user to access a corresponding view/page of GUI 1100. For example, navigation option 1106-1 may be configured to allow the user to access the view of GUI 1100 shown in FIG. 11. The view of GUI 1100 shown in FIG. 11 may be configured to allow a user to navigate between and/or select any of sessions 1102.

Figure 12:
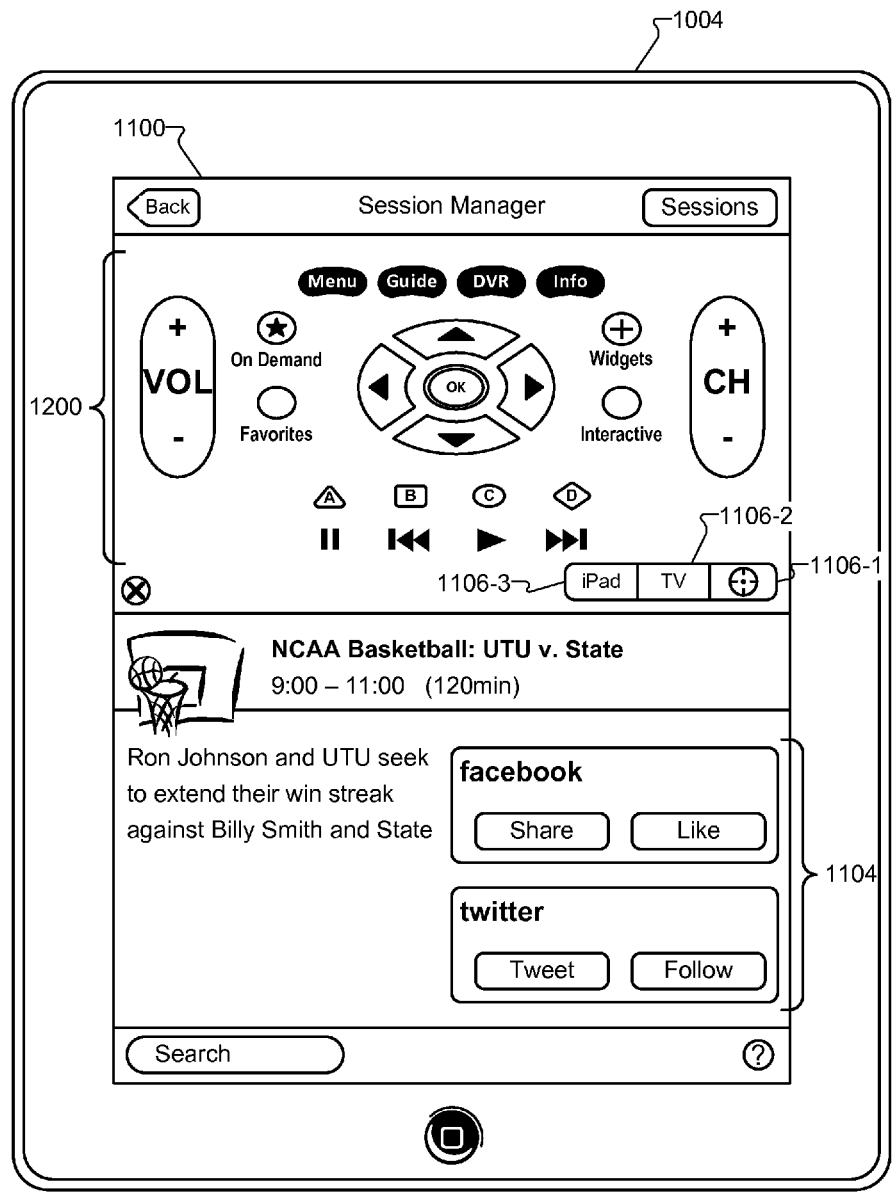

Navigation option 1106-2 may be configured to allow the user to access a view of GUI 1100 shown in FIG. 12. In some examples, the view of GUI 1100 shown in FIG. 12 may be configured to facilitate control of the presentation of the selected media content session (e.g., session 1102-1) by the corresponding STB device (e.g., STB device 1002-1). For example, as shown in FIG. 12, GUI 1100 may include one or more remote control options 1200 configured to facilitate the control of STB device 1002-1 and/or a corresponding display device by way of mobile device 1004. Options 1200 may include any suitable options associated with the control of a media content access device and/or a display device.

Figure 13:
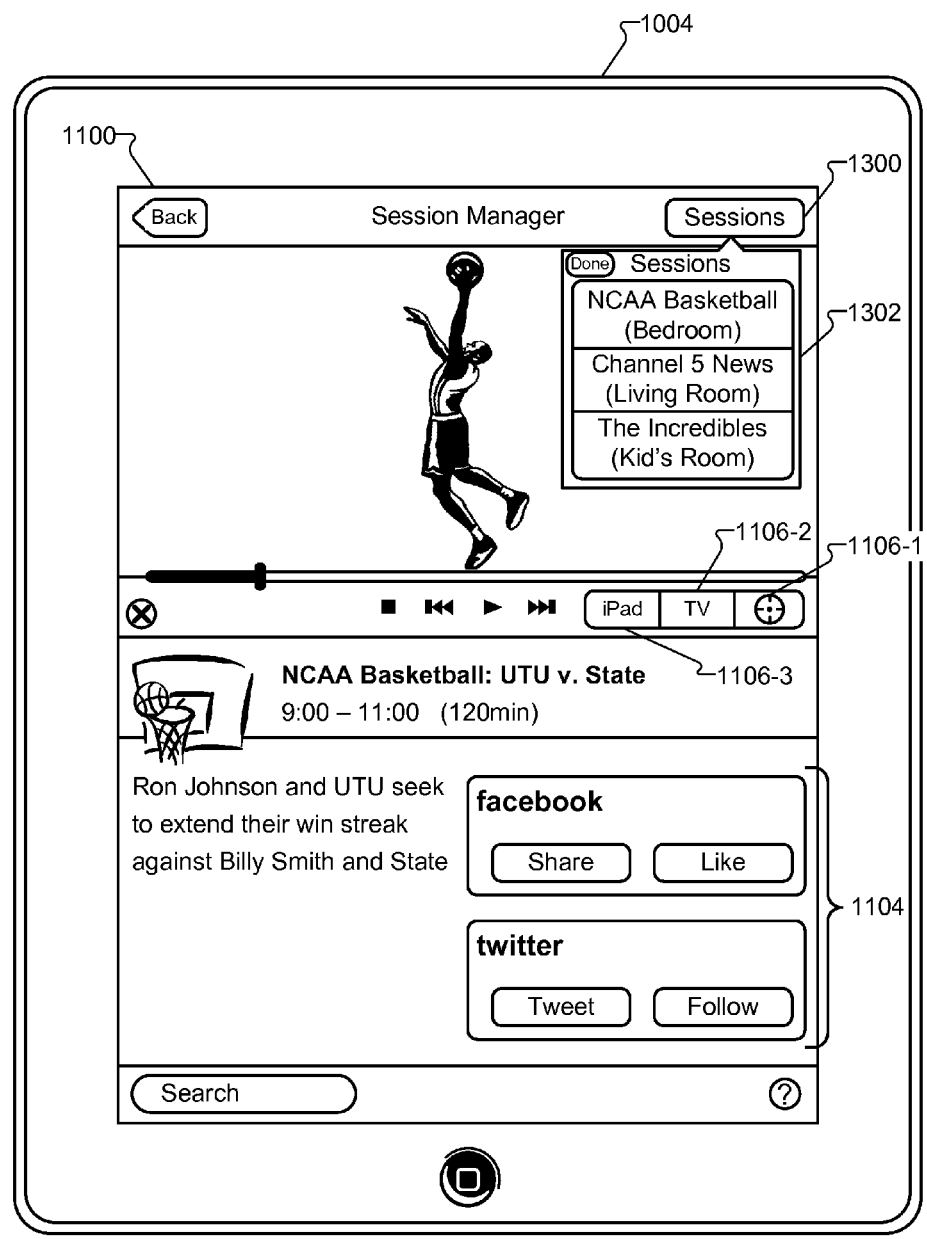

Navigation option 1106-3 may be configured to allow the user to access a view of GUI 1100 shown in FIG. 13. In some examples, the view of GUI 1100 shown in FIG. 13 may be configured to present a selected/targeted media content session by way of mobile device 1004. To illustrate, GUI 1100 may include a display of the selected media content session as well as one or more options and/or indicators configured to facilitate the user's control and/or experience of the media content session.

In accordance with the foregoing, a user may utilize navigation options 1106 to toggle between different pages/views of GUI 1100 to select media content sessions and/or access corresponding options, information, and content.

As further shown in FIG. 13, GUI 1100 may include a "sessions" option 1300 configured to allow a user to access a drop-down menu 1302 including a summary of active media content sessions detected by mobile device 1004. In some examples, a user may utilize menu 1302 to navigate from one session to another (e.g., to change the current session from one session to another). For example, after opening menu 1302, the user may select any listed session to target and/or access the session.

Figure 14:
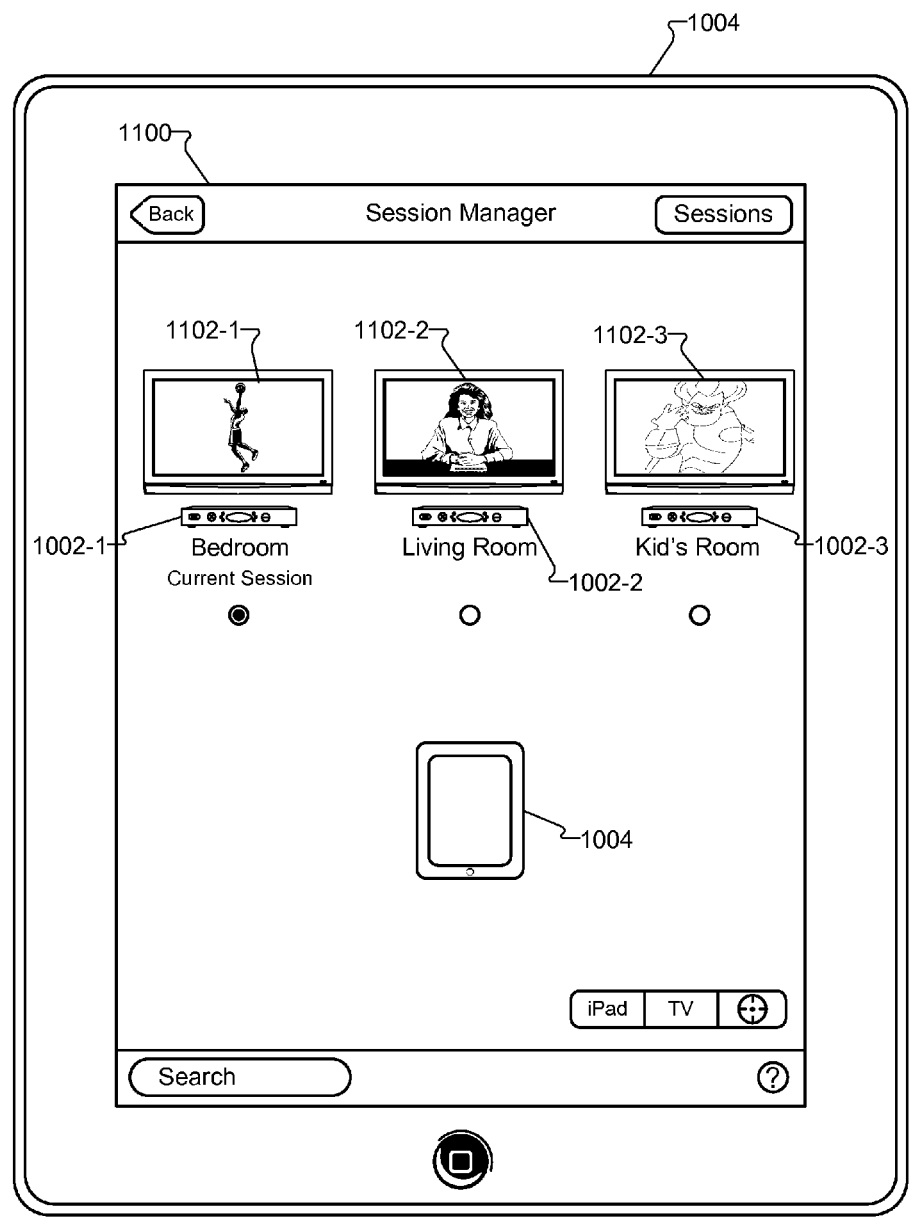

GUI 1100 may be further configured to facilitate the sharing and/or shifting of media content sessions. For example, FIG. 14 shows a view of GUI 1100 that is configured to facilitate the sharing and/or shifting of sessions 1102 among STB devices 1002 and/or mobile device 1004. As shown in FIG. 14, GUI 1100 includes graphical depictions of STB devices 1002, mobile device 1004, and sessions 1102. A user may utilize GUI 1100 to selectively share and/or shift one of sessions 1102. In some examples, a user may select (e.g., by way of a touch screen) a particular session 1102 and drag the selected session from one access device to another access device to share the selected session with the other access device and/or shift the selected session to the other access device.

Figure 15:
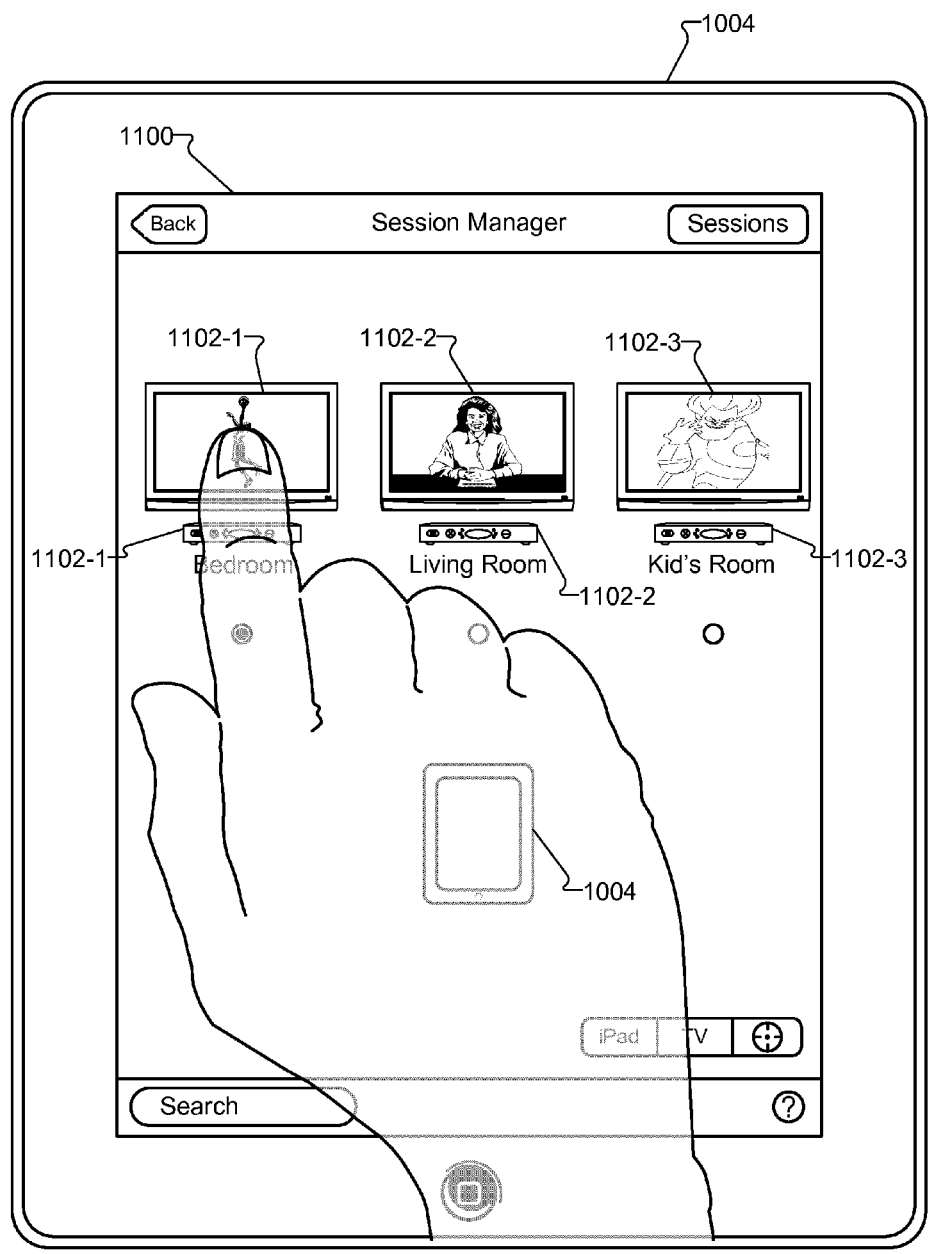
Figure 16:
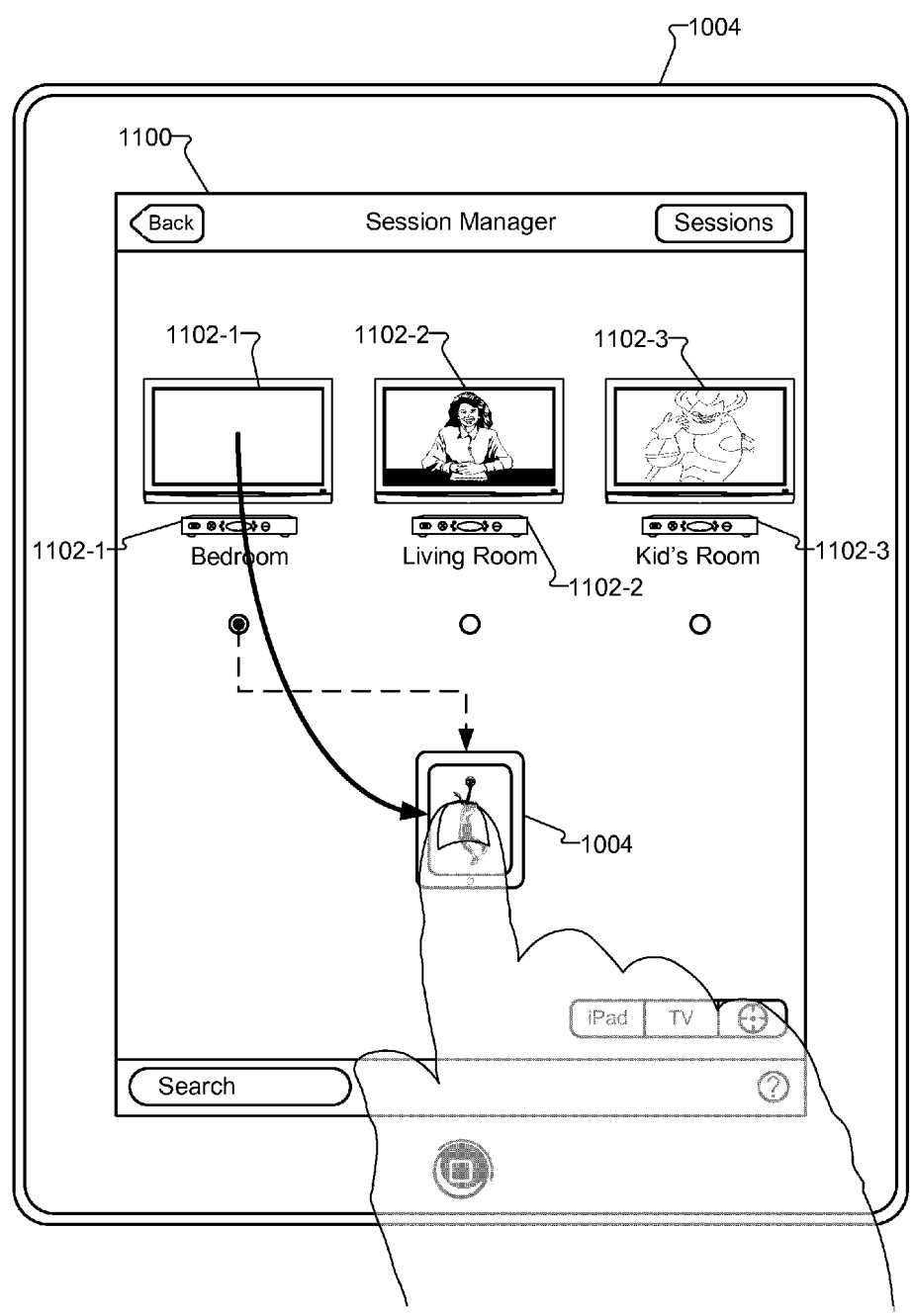

To illustrate the foregoing, a user experiencing session 1102-1 by way of STB device 1002-1 may desire to move to the living room while continuing to experience session 1102-1. Accordingly, the user may utilize GUI 1100 to shift session 1102-1 to mobile device 1004 and then utilize mobile device 1004 to experience session 1102-1 while the user moves locations. For example, as shown in FIG. 15, the user may select session 1102-1 and drag session 1102-1 from STB device 1002-1 to mobile device 1004. In response to the user's interaction with session 1102-1, STB device 1002-1 may discontinue presenting session 1102-1 and/or transmit data representative of session 1102-1 to mobile device 1004 (e.g., by way of LAN 1006). In some examples, STB device 1002-1 may continue to access (e.g., tune to) session 1102-1 and transmit data representative of session 1102-1 to mobile device 1004 until session 1102-1 is terminated and/or shifted to another access device. Additionally or alternatively, STB device 1002-1 may be configured to direct mobile device 1004 to independently access session 1102-1.

Once the user arrives in the living room, the user may utilize GUI 1100 to shift session 1102-1 to STB device 1002-2 and continue experiencing session 1102-1 in the living room. Accordingly, the user can move from one location without interrupting his/her experience of a media content session.

Figure 17:
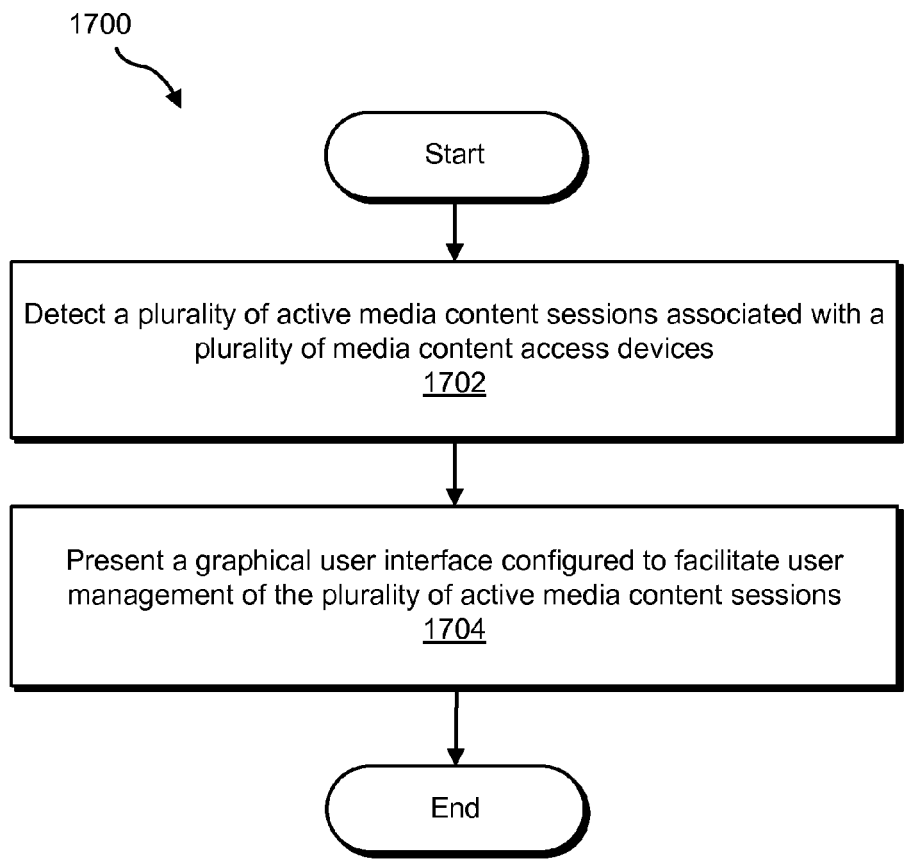
FIG. 17 illustrates an exemplary method of managing media content sessions according to principles described herein.

FIG. 17 illustrates an exemplary method 1700 of managing media content sessions. While FIG. 17 illustrates exemplary steps according to one embodiment, other embodiments may omit, add to, reorder, and/or modify any of the steps shown in FIG. 17. One or more of the steps shown in FIG. 17 may be performed by any component or combination of components of system 100, implementation 200, and/or implementation 1000.

In step 1702, a media content access device detects a plurality of active media content sessions associated with a plurality of media content access devices. The media content access device may be configured to detect the plurality of active media content sessions in any suitable manner, such as described herein.

In step 1704, the media content access device presents a graphical user interface configured to facilitate user management of the plurality of active media content sessions. For example, the media content access device may be configured to present the graphical user interface in any suitable manner, such as described herein. The user management of the active media content sessions may include any of the above-described operations and may be facilitated in any of the ways described herein.

Figure 18:
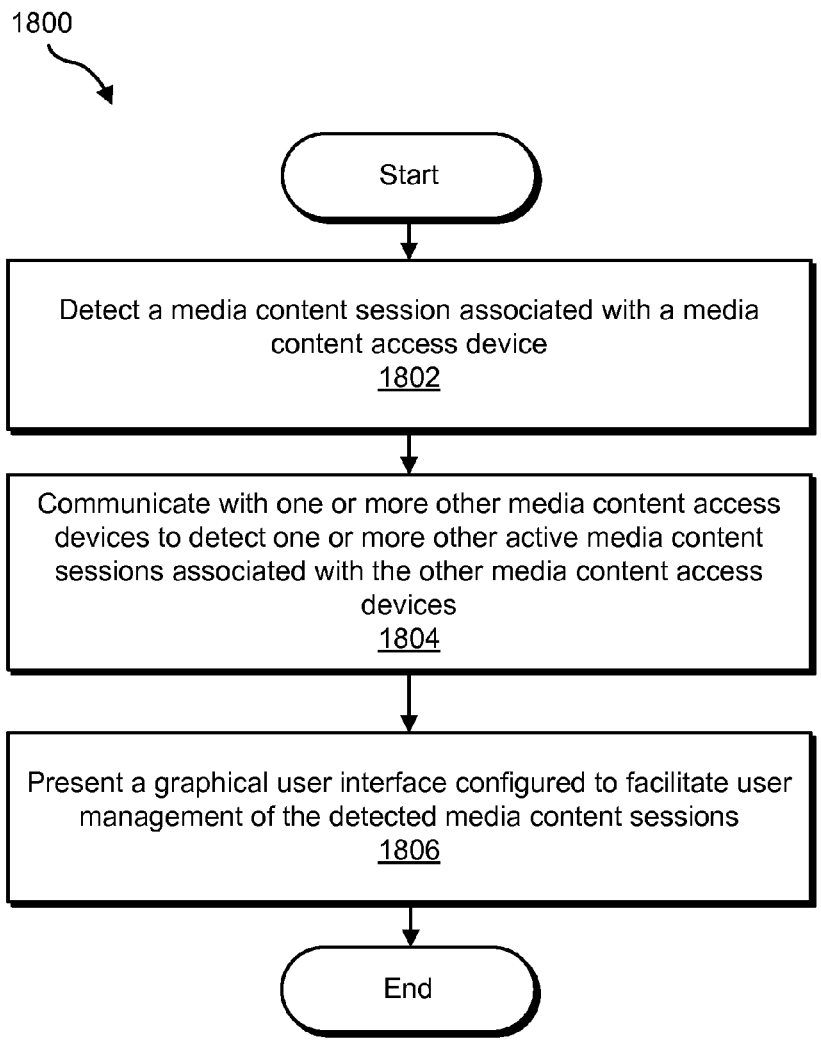
FIG. 18 illustrates another exemplary method of managing media content sessions according to principles described herein.

FIG. 18 illustrates another exemplary method 1800 of managing media content sessions. While FIG. 18 illustrates exemplary steps according to one embodiment, other embodiments may omit, add to, reorder, and/or modify any of the steps shown in FIG. 18. One or more of the steps shown in FIG. 18 may be performed by any component or combination of components of system 100, implementation 200, and/or implementation 1000.

In step 1802, a media content access device detects a media content session associated with the media content access device. For example, the media content access device may be configured to detect the media content session in any suitable manner, such as described herein.

In step 1804, the media content access device communicates with one or more other media content access devices to detect one or more other media content sessions associated with the other media content access devices. For example, the media content access device may be configured to communicate with the other media content access devices and/or detect the other media content sessions in any suitable manner, such as described herein.

In step 1806, the media content access device presents a graphical user interface configured to facilitate user management of the detected media content sessions. For example, the media content access device may be configured to present the graphical user interface in any suitable manner, such as described herein. The user management of the active media content sessions may include any of the above-described operations and may be facilitated in any of the ways described herein.

In certain embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 19:
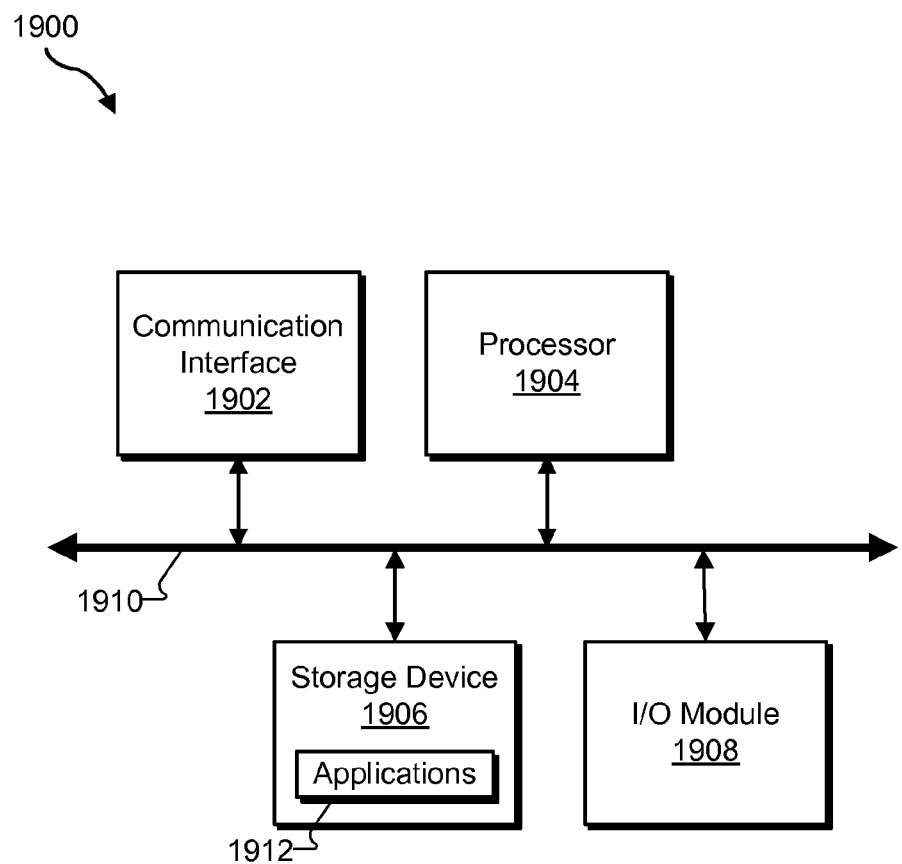
FIG. 19 illustrates an exemplary computing device according to principles described herein.

FIG. 19 illustrates an exemplary computing device 1900 that may be configured to perform one or more of the processes described herein. As shown in FIG. 19, computing device 1900 may include a communication interface 1902, a processor 1904, a storage device 1906, and an input/output ("I/O") module 1908 communicatively connected via a communication infrastructure 1910. While an exemplary computing device 1900 is shown in FIG. 19, the components illustrated in FIG. 19 are not intended to be limiting. Additional or alternative components may be used in other embodiments. Components of computing device 1900 shown in FIG. 19 will now be described in additional detail.

Communication interface 1902 may be configured to communicate with one or more computing devices. Examples of communication interface 1902 include, without limitation, a wired network interface (such as a network interface card), a wireless network interface (such as a wireless network interface card), a modem, and any other suitable interface. Communication interface 1902 may be configured to interface with any suitable communication media, protocols, and formats, including any of those mentioned above. In at least one embodiment, communication interface 1902 may provide a communicative connection between access devices 104 and provider subsystem 102 via a direct link to a WAN, such as network 106 of FIG. 1. In additional or alternative examples, communication interface 1902 may provide a communicative connection between two or more of access devices 104 via a direct link to a LAN. Accordingly, for example, an access device may utilize communication interface 1902 to transmit a request for active session data to one or more other access devices over the LAN, to receive a request for active session data from one or more other access devices over the LAN, to respond to a request for active session data by providing (e.g., transmitting) the active session data over the LAN, to transmit media content data (e.g., a media content stream carrying a shared/shifted media content session) over the LAN, and/or to transmit/receive any other suitable communications/data as may serve a particular implementation and/or according to principles described herein.

Processor 1904 generally represents any type or form of processing unit capable of processing data or interpreting, executing, and/or directing execution of one or more of the instructions, processes, and/or operations described herein. Processor 1904 may direct execution of operations in accordance with one or more applications 1912 or other computer-executable instructions such as may be stored in storage device 1906 or another computer-readable medium.

Storage device 1906 may include one or more data storage media, devices, or configurations and may employ any type, form, and combination of data storage media and/or device. For example, storage device 1906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1906. For example, data representative of one or more executable applications 1912 (which may include, but are not limited to, one or more of the software applications described herein) configured to direct processor 1904 to perform any of the operations described herein may be stored within storage device 1906. In some examples, data may be arranged in one or more databases residing within storage device 1906.

I/O module 1908 may be configured to receive user input and provide user output and may include any hardware, firmware, software, or combination thereof supportive of input and output capabilities. For example, I/O module 1908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1908 is configured to provide graphical data to a display for presentation to a user. The graphical data may be representative of one or more graphical user interfaces and/or any other graphical content as may serve a particular implementation.

In some examples, any of the features described herein may be implemented/performed by one or more components of computing device 1900. For example, one or more applications 1912 residing within storage device 1906 may be configured to direct processor 1904 to perform one or more processes or functions associated system 100.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a media content access device, a first media content session being presented by a first additional media content access device and a second media content session being presented by a second additional media content access device, the first additional media content access device being interconnected with the second additional media content access device by way of a local area network, the detecting comprising;
   transmitting, to the first additional media content access device and the second additional media content access device, a request for active session data; and
   receiving, from the first additional media content access device and the second additional media content access device, the active session data, the active session data including a first media content stream carrying at least a portion of the first media content session and a second media content stream carrying at least a portion of the second media content session;
   presenting, by the media content access device, a graphical user interface that facilitates user management of the first media content session and the second media content session, wherein the graphical user interface presents a graphical depiction of the at least a portion of the first media content session and a graphical depiction of the at least a portion of the second media content session included in the active session data and is configured to receive a predetermined user input provided by a user of the media content access device by way of the media content access device to share the first media content session being presented by the first additional media content access device with the second additional media content access device, the predetermined user input comprising selecting and dragging the graphical depiction of the at least a portion of the first media content session onto the graphical depiction of the at least a portion of the second media content session;
   detecting, by the media content access device, the predetermined user input provided by way of the media content access device requesting that the first additional media content access device share the first media content session with the second additional media content access device; and
   transmitting, by the media content access device in response to detecting of the predetermined user input, a notification to the second additional media content access device that the first additional media content access device is requesting to share the first media content session with the second additional media content access device,
   wherein the notification directs the second additional media content access device to present a second graphical user interface having a plurality of selectable options configured to allow a user of the second additional media content access device to initiate a presentation of the at least a portion of the first media content session by the second additional media content access device simultaneously with the presentation of the first media content session by the first additional media content access device.

2. The method of claim 1, further comprising presenting, by the second additional media content access device, the at least a portion of the first media content session simultaneously with the presentation, by the first additional media content access device, of the first media content session.

3. The method of claim 2, wherein the at least a portion of the first media content session is presented, by the second additional media content access device, within a picture-in-picture window.

4. The method of claim 2, wherein the presentation of the at least a portion of the first media content session by the second additional media content access device substantially mirrors the presentation of the at least a portion of the first media content session by the first additional media content access device.

5. The method of claim 2, further comprising:
receiving, by the media content access device, a message provided by the user of the media content access device; and
delivering, by the media content access device, data representative of the message to the second additional media content access device for presentation in conjunction with the at least a portion of the first media content session.

6. The method of claim 1, wherein the presentation of the first media content session comprises a presentation of a live media content stream.

7. The method of claim 1, wherein the presentation of the first media content session comprises a presentation of a media content instance carried by a live television broadcast stream received from a television broadcast service provider.

8. The method of claim 1, wherein the presenting the graphical user interface further comprises presenting at least one of the first media content session and the second media content session within the graphical user interface in real time.

9. The method of claim 1, wherein the media content access device comprises a set-top box companion device.

10. The method of claim 1, wherein the local area network comprises a home network.

11. The method of claim 1, wherein the detecting of the first media content session associated with the first additional media content access device and the second media content session associated with the second additional media content access device comprises communicating, by the media content access device, with the first additional media content access device and the second additional media content access device by way of the local area network.

12. The method of claim 1, embodied as computer-executable instructions on at least one non-transitory computer-readable medium.

13. The method of claim 1, wherein the graphical user interface further provides another selectable option associated with the first media content session and configured to be selected by the user of the media content access device to provide one or more parental control parameters configured to restrict the first additional media content session.

14. The method of claim 13, further comprising:
detecting, by the media content access device, a user selection of the another selectable option;
receiving, by the media content access device, the one or more parental control parameters provided by the user associated with the media content access device;
transmitting, by the media content access device, data representative of the one or more parental control parameters to the first additional media content access device; and
restricting, by the first additional media content access device, the first additional media content session in accordance with the parental control parameters.

15. The method of claim 1, wherein the detecting of the first media content session being presented by the first additional media content access device and the second media content session being presented by the second additional media content access device comprises communicating, by the media content access device, with the first additional media content access device and the second additional media content access device by way of a wide area network.

16. A system comprising:
a plurality of set-top box devices interconnected by way of a local area network; and
a tablet computing device,
wherein the tablet computing device is configured to:
communicate with the plurality of set-top box devices to detect a plurality of media content sessions being presented by the plurality of set-top box devices, the detecting of the plurality of media content sessions comprising:
transmitting, to a first set-top box device included in the plurality of set-top box devices and a second set-top box device included in the plurality of set-top box devices, a request for active session data; and
receiving, from the first set-top box device and the second set-top box device, the active session data, the active session data including a first media content stream carrying at least a portion of a first media content session included in the plurality of media content sessions and being presented by the first set-top box device and a second media content stream carrying at least a portion of a second media content session included in the plurality of media content sessions and being presented by the second set-top box device;
present a graphical user interface configured to facilitate user management of the plurality of media content sessions, wherein the graphical user interface is configured to:
present a graphical depiction of the at least a portion of the first media content session and a graphical depiction of the at least a portion of the second media content session included in the active session data; and
receive a predetermined user input provided by a user of the tablet computing device by way of the tablet computing device to share the first media content session with the second set-top box device, the predetermined user input comprising selecting and dragging the graphical depiction of the at least a portion of the first media content session onto the graphical depiction of the at least a portion of the second media content session;
detect the predetermined user input provided by way of the media content access device requesting that the first set-top box device share the first media content session with the second set-top box device, and
transmit, in response to the detection of the predetermined user input, a notification to the second set-top box device that the first set-top box device is requesting to share the first media content session with the second set-top box device, and
wherein the notification is configured to direct the second set-top box device to present a second graphical user interface having a plurality of selectable options configured to allow a user of the second set-top box device to initiate a presentation of the at least a portion of the first media content session by the second set-top box device simultaneous with the presentation of the first media content session by the first set-top box device.

17. The system of claim 16, wherein the tablet computing device is further configured to direct the first set-top box device to share the at least a portion of the first media content session with the second set-top box device.

18. A media content access device that:
  detects a presentation of a first media content session by a first additional media content access device and a presentation of a second media content session by a second additional media content access device, the first additional media content access device being interconnected with the second additional media content access device by way of a local area network, and the detecting of the presentation of the first media content session and the presentation of the second media content session comprising:
    transmitting, to the first additional media content access device and the second additional media content access device, a request for active session data; and
    receiving, from the first additional media content access device and the second additional media content access device, the active session data, the active session data including a first media content stream carrying at least a portion of the first media content session and a second media content stream carrying at least a portion of the second media content session;
  presents a graphical user interface that facilitates user management of the first media content session and the second media content session, wherein the graphical user interface presents a graphical depiction of the at least a portion of the first media content session and a graphical depiction of the at least a portion of the second media content session included in the active session data and is configured to receive a predetermined user input provided by a user of the media content access device by way of the media content access device to share the first media content session with the second additional media content access device, the predetermined user input comprising selecting and dragging the graphical depiction of the at least a portion of the first media content session onto the graphical depiction of the at least a portion of the second media content session;
  detects the predetermined user input provided by way of the media content access device requesting that the first additional media content access device share the first media content session with the second additional media content access device;
  transmits, in response to the detecting of the predetermined user input, a notification to the second additional media content access device that the first additional media content access device is requesting to share the first media content session with the second additional media content access device,
  wherein the notification directs the second additional media content access device to present a second graphical user interface having plurality of selectable options configured to allow a user of the second additional media content access device to initiate performance of the presentation of the at least a portion of the first media content session by the second additional media content access device simultaneously with the presentation of the first media content session by the first additional media content access device.

19. A method comprising:
  detecting, by a media content access device associated with a user, a plurality of active media content sessions being presented by a plurality of additional media content access devices by
    transmitting, to a first additional media content access device included in the plurality of additional media content access devices and a second additional media content access device included in the plurality of additional media content access devices, a request for active session data; and
    receiving, from the first additional media content access device and the second additional media content access device, the active session data, the active session data including a first media content stream carrying at least a portion of a first active media content session included in the plurality of active media content sessions and a second media content stream carrying at least a portion of a second active media content session included in the plurality of active media content sessions;
  presenting, by the media content access device, a graphical user interface that facilitates user management of the plurality of active media content sessions, wherein the graphical user interface presents a graphical depiction of the at least a portion of the first active media content session and a graphical depiction of the at least a portion of the second active media content session included in the active session data and is configured to receive a predetermined user input provided by the user of the media content access device by way of the media content access device to share the first active media content session with the second additional media content access device, the predetermined user input comprising selecting and dragging the graphical depiction of the at least a portion of the first active media content session onto the graphical depiction of the at least a portion of the second active media content session;
  detecting, by the media content access device, the predetermined user input provided by way of the media content access device requesting that the first additional media content access device share the first active media content session with the second additional media content access device;
  transmitting, by the media content access device in response to the detecting of the predetermined user input, a notification to the second additional media content access device that the first additional media content access device is requesting to share the first active media content session with the second additional media content access device,
  wherein the notification directs the second additional media content access device to present a second graphical user interface having a plurality of selectable options configured to allow a user of the second additional media content access device to initiate a presentation, by the second additional media content access device simultaneously with the presentation of the first active media content session, of the first active media content session.

20. The method of claim 19, wherein the media content access device comprises a mobile device and the plurality of additional media content access devices comprise a plurality of set-top box devices.

21. The method of claim 20, wherein the mobile device is communicatively coupled to the plurality of set-top box devices by way of a wide area network.

22. The method of claim 21, wherein the wide area network comprises at least one of a 3G network, a 4G network, and the Internet.

23. The method of claim 21, wherein the mobile device is communicatively coupled to the wide area network by way of a Wi-Fi hotspot.

* * * * *